(12) United States Patent
Rotenberg

(10) Patent No.: US 12,293,316 B1
(45) Date of Patent: May 6, 2025

(54) SYSTEM AND METHOD OF END-TO-END SUPPLY CHAIN SEGMENTATION

(71) Applicant: JDA Software Group, Inc., Scottsdale, AZ (US)

(72) Inventor: Alexis Rotenberg, Egham (GB)

(73) Assignee: Blue Yonder Group, Inc., Scottsdale, AZ (US)

(*) Notice: Subject to any disclaimer, the term of this patent is extended or adjusted under 35 U.S.C. 154(b) by 0 days.

(21) Appl. No.: 15/723,554

(22) Filed: Oct. 3, 2017

Related U.S. Application Data

(60) Provisional application No. 62/403,576, filed on Oct. 3, 2016.

(51) Int. Cl.
*G06Q 10/0631* (2023.01)
*G06Q 10/087* (2023.01)

(52) U.S. Cl.
CPC ..... *G06Q 10/06315* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 6,954,734 B1* | 10/2005 | Kuelbs | .................. | G06Q 10/025 705/14.1 |
| 7,574,383 B1* | 8/2009 | Parasnis | ........... | G06Q 10/06315 705/28 |
| 9,953,287 B1* | 4/2018 | McDonald, Jr. | .... | G06Q 10/0832 |
| 2005/0071182 A1* | 3/2005 | Aikens | ................ | H04L 47/2408 705/500 |
| 2006/0111963 A1* | 5/2006 | Li | .......................... | G06Q 10/04 705/7.31 |
| 2006/0161471 A1* | 7/2006 | Hulen | .............. | G06Q 10/06393 705/7.39 |
| 2008/0184231 A1* | 7/2008 | Dreiling | ................. | G06Q 10/06 718/100 |
| 2008/0312979 A1* | 12/2008 | Lee | .................... | G06Q 10/0635 705/7.39 |
| 2009/0006156 A1* | 1/2009 | Hunt | ...................... | G06Q 30/02 705/7.11 |
| 2010/0082385 A1* | 4/2010 | Cao | ........................ | G06Q 10/06 715/771 |

(Continued)

OTHER PUBLICATIONS

Adams J., Creehan K., Sporn J., Balaban R., Santhanam S., Peter J., Key performance levers in your business: The performance improvement priorities of billion dollar CEOs, (2014), Oliver Wyman, pp. 1-12 (Year: 2014).*

(Continued)

*Primary Examiner* — Sara Grace Brown
(74) *Attorney, Agent, or Firm* — Spencer Fane LLP; Steven J. Laureanti

(57) ABSTRACT

A system and method are disclosed for identifying supply chain segmentations from an initially non-segmented supply chain is disclosed. Embodiments of identifying supply chain segmentations includes receiving a current state of items in a supply chain network, wherein an inventory of the one or more supply chain entities is used to store one or more items, organizing one or more supply chain entities into one or more customer clusters, associating supply chain models for customer clusters, and transporting items among one or more supply chain entities.

17 Claims, 21 Drawing Sheets

(56) References Cited

U.S. PATENT DOCUMENTS

| | | | |
|---|---|---|---|
| 2011/0295656 A1* | 12/2011 | Venkatasubramanian ................... | |
| | | | G06Q 10/06393 |
| | | | 705/7.39 |
| 2012/0030070 A1* | 2/2012 | Keller ................ | G06Q 10/087 |
| | | | 705/28 |
| 2012/0084223 A1* | 4/2012 | Briet ................ | G06Q 10/08355 |
| | | | 705/338 |
| 2012/0253890 A1* | 10/2012 | Paliwal ................ | G06Q 10/06 |
| | | | 705/7.39 |
| 2013/0166468 A1* | 6/2013 | Vogelgesang ........ | G06Q 10/087 |
| | | | 705/330 |
| 2013/0191187 A1* | 7/2013 | Ludwig ............ | G06Q 10/06375 |
| | | | 705/7.39 |
| 2014/0229243 A1* | 8/2014 | Singh ................ | G06Q 99/00 |
| | | | 705/7.36 |
| 2014/0304033 A1* | 10/2014 | Cardno ............... | G06F 16/2246 |
| | | | 705/7.29 |
| 2014/0310034 A1* | 10/2014 | Li .................... | G06Q 10/06393 |
| | | | 705/7.11 |
| 2015/0073925 A1* | 3/2015 | Renfroe ............ | G06Q 30/0641 |
| | | | 705/15 |
| 2015/0227878 A1* | 8/2015 | Clay ................ | G06Q 30/0241 |
| | | | 705/7.39 |
| 2015/0358207 A1* | 12/2015 | Baldock ............... | H04L 43/062 |
| | | | 709/224 |
| 2016/0171414 A1* | 6/2016 | Lee ................ | G06Q 10/06393 |
| | | | 705/7.39 |
| 2017/0011327 A1* | 1/2017 | Mantri .......... | G06Q 10/063114 |
| 2017/0017368 A1* | 1/2017 | Maheshwari .......... | H04L 41/22 |
| 2017/0154302 A1* | 6/2017 | Streebin ................ | G06T 17/30 |
| 2017/0337511 A1* | 11/2017 | Shroff ................ | G06Q 10/0833 |
| 2018/0033079 A1* | 2/2018 | Porter ................ | G06Q 10/0631 |
| 2018/0088586 A1* | 3/2018 | Hance .................. | G06Q 50/28 |

OTHER PUBLICATIONS

Lee S., Klassen R., "Drivers and Enablers That Foster Environmental Management Capabilities in Small- and Medium-Sized Suppliers in Supply Chains," Nov.-Dec. 2008, Production and Operations Management, vol. 17, No. 6, pp. 573-586 (Year: 2008).*

Marr B., Schiuma G., Neely A., "Intellectual capital—defining key performance indicators for organizational knowledge assets," 2004, Business Process Management Journal vol. 10 No. 5 (Year: 2004).*

Sabri, E., "Creating High-Impact Supply Chain Metrics," Dec. 27, 2013, www.supplychain247.com (Year: 2013).*

Wetzstein, Branimir, et al. "Preventing KPI violations in business processes based on decision tree learning and proactive runtime adaptation." Jan. 2012, Journal of Systems Integration 3.1 (2012): 3. (Year: 2012).*

Van Velzen, J., ""Drillable" KPI Tree with Animation Custom Lumira Extension," Apr. 1, 2015, SAP Community Blog (Year: 2015).*

Almeida, António, and Américo Azevedo. "A multi-perspective performance approach for complex manufacturing environments." Jul. 27, 2016, Journal of Innovation Management 4.2 (2016): 125-155. (Year: 2016).*

Jochem, Roland, Martin Menrath, and Katja Landgraf. "Implementing a quality-based performance measurement system: A case study approach." The TQM Journal 22.4 (2010): 410-422. (Year: 2010).*

Pourshahid, Alireza, et al. "Business process management with the user requirements notation." Electronic Commerce Research 9 (2009): 269-316. (Year: 2009).*

* cited by examiner

| 702 | 712 | 714 | 704 | 716 | 718 |
|---|---|---|---|---|---|
| CUSTOMER BUSINESS MODEL | KEY - CBM CHARACTERISTICS | SERVICE REQUIREMENT | SC MODEL | KEY - SCM CHARACTERISTICS | SERVICE OFFERING |
| COLLABORATIVE CAR DEALER AND FAST FITTER (WITH STORAGE) LARGE WHOLESALE/ IMPORTER-IMPORTANT [COMPLETE PORTFOLIO], AUTO CENTER AND | • STRATEGIC CUSTOMER<br>• CONTRACTUAL BUSINESS<br>• PRE STOCKING<br>• LARGE ORDERS<br>• STRICT DELIVERY<br>• HIGH OLT<br>• IN-SEASON(ADHOC) | • MEET CONTRACTUAL REQUIREMENT<br>• MEET RDD<br>• CDD RELIABILITY<br>• ADHOC(IN-SEASON) | COLLABORATIVE SC MODEL | • CCN LEVEL FORECAST COLLABORATION AND ATP PROTECTION<br>• INVENTORY LOCATION - PWH OR RDC AS PER COLLABORATION<br>• DS AND RDC SHIPMENT | <u>COLLABORATIVE SERVICE</u> PROVIDE CUSTOMER LEVEL COLLABORATION TO MEET CUSTOMER SPECIFIC SERVICE LEVEL REQUIREMENT | 706a
| ADHOC CAR DEALER, CONTROLLED DISTRIBUTION, PG, AUTO CENTER, FAST FITTERS (WITH OUTLET) | • SALES AND MKT PROG<br>• ADHOC ORDERS<br>• RDC DELIVERY<br>• VOLATILE DEMAND<br>• LOW OLT | • MEET ADHOC REQUIREMENT<br>• < 24HRS DELIVERY<br>• GOOD SERVICE LEVEL FOR STRATEGIC / PREMIUM ARTICLES | AGILE SC MODEL | • CLUSTER LEVEL FORECAST AND ATP PROTECTION<br>• PLAN DOWNSTREAM INVENTORY AT RDC PRIOR TO ORDERS<br>• RDC SHIPMENTS | <u>PREMIUM SERVICE</u> PROVIDE AVAILABILITY OF SUPPLY TO MEET ADHOC SERVICE LEVEL REQUIREMENT | 706b
| STANDARD IMPORTER, WHOLESALE, PURCHASE GROUPS ETC. (INCL. BOTH STORAGE AND OUTLET) | • LIMITED DEMAND MANAGEMENT<br>• PRE STOCKING<br>• LARGE ORDERS<br>• HIGH OLT<br>• MAXIMIZE DS<br>• IN-SEASON(ADHOC) | • LIMITED ADHOC REQUIREMENT<br>• > 24HRS DELIVERY<br>• MEET RDD | RESPONSIVE SC MODEL | • ICO LEVEL FORECAST AND NO ATP PROTECTION<br>• UPSTREAM INVENTORY POSITIONING - LATE BINDING<br>• PRIMARILY PLANT-DS SHIPMENT AND REMAINING RDC SHIPMENTS | <u>STANDARD SERVICE</u> PROVIDE STANDARD SERVICE | 706c

FIG. 7

| | 706a | 706b | 706c |
|---|---|---|---|

| 702 CUSTOMER BUSINESS MODEL | 712 KEY - CBM CHARACTERISTICS | 714 SERVICE REQUIREMENT | 704 SC MODEL | 716 KEY - SCM CHARACTERISTICS | 718 SERVICE OFFERING |
|---|---|---|---|---|---|
| COLLABORATIVE DIRECT FLEET, ARMY AND AUTHORITIES LARGE IMPORTER AND WHOLESALE - IMPORTANT | • STRATEGIC RELATION<br>• CONTRACTUAL BUSINESS - ARMY<br>• FORECAST COLLAB - DIRECT FLEET<br>• DAILY/WEEKLY/ MONTHLY ORDER<br>• LOW OLT - FLEET<br>• HIGH OLT - OTHERS<br>• LIMITED SEASON IMPACT | • MEET CONTRACTUAL REQUIREMENT - ARMY<br>• MEET RDD - DIRECT FLEET (ADHOC) | COLLABORATIVE SC MODEL | • CCN LEVEL FORECAST COLLABORATION AND ATP PROTECTION<br>• INVENTORY LOCATION - AS PER COLLABORATION<br>• DS - IMPORTER/ WHOLESALE/ARMY<br>• RDC - DIRECT FLEET<br>• DS AND RDC DELIVERY | COLLABORATIVE SERVICE<br>PROVIDE CUSTOMER LEVEL COLLABORATION TO MEET CUSTOMER SPECIFIC SERVICE LEVEL REQUIREMENT |
| ADHOC INDEPENDENT, PURCHASE GROUP, CONTROLLED DISTRIBUTION (WITH OUTLETS) | • SALES AND MKT PROG<br>• ADHOC ORDERS<br>• RDC DELIVERY<br>• VOLATILE DEMAND<br>• LOW OLT<br>• LIMITED SEASON IMPACT | • MEET ADHOC REQUIREMENT<br>• < 24HRS DELIVERY<br>• GOOD SERVICE LEVEL FOR SPECIFIC ARTICLES | AGILE SC MODEL | • CLUSTER LEVEL FORECAST AND ATP PROTECTION<br>• PLAN DOWNSTREAM INVENTORY AT RDC PRIOR TO ORDERS<br>• RDC SHIPMENTS | PREMIUM SERVICE<br>PROVIDE AVAILABILITY OF SUPPLY TO MEET ADHOC SERVICE LEVEL REQUIREMENT |
| STANDARD IMPORTER, WHOLESALE AND OTHERS (INCL. BOTH STORAGE AND OUTLET) | • LIMITED DEMAND MANAGEMENT<br>• LARGE ORDERS<br>• HIGH OLT<br>• MAXIMIZE DS<br>• LIMITED SEASON IMPACT | • LIMITED ADHOC REQUIREMENT<br>• MEET RDD | RESPONSIVE SC MODEL | • ICO LEVEL FORECAST AND NO ATP PROTECTION<br>• UPSTREAM INVENTORY POSITIONING - LATE BINDING<br>• PRIMARILY PLANT-DS SHIPMENT AND REMAINING RDC SHIPMENTS | STANDARD SERVICE<br>PROVIDE STANDARD SERVICE |

FIG. 8

SYSTEM AND METHOD OF END-TO-END SUPPLY CHAIN SEGMENTATION

CROSS-REFERENCE TO RELATED APPLICATIONS

The present disclosure is related to that disclosed in the U.S. Provisional Application No. 62/403,576, filed Oct. 3, 2016, entitled "System and Method of End-to-End Supply Chain Segmentation." U.S. Provisional Application No. 62/403,576 is assigned to the assignee of the present application. The subject matter disclosed in U.S. Provisional Application No. 62/403,576 is hereby incorporated by reference into the present disclosure as if fully set forth herein. The present invention hereby claims priority under 35 U.S.C. § 119 (e) to U.S. Provisional Application No. 62/403,576.

TECHNICAL FIELD

The present disclosure relates generally to supply chain segmentation and specifically to a system and method of segmenting a supply chain network based on customer and product attributes.

BACKGROUND

Many companies struggle to differentiate service to customers for their products in a consistent way. Standard supply chain processes, combined with a multitude of customers and products, make it difficult to deliver special services without workarounds in order-taking and planning systems. Determining how deep and granular service differentiation should be is difficult because having too much leads to complexity, while having too little does not differentiate a service offering sufficiently. These drawbacks are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 7 illustrates exemplary customer business models and supply chain models for customer clusters of an exemplary tire company for passenger and light truck vehicle tires, according to an embodiment;

FIG. 8 illustrates exemplary customer business models and supply chain models for customer clusters of an exemplary tire manufacturer of heavy truck tires, according to an embodiment;

DETAILED DESCRIPTION

Figure 1:
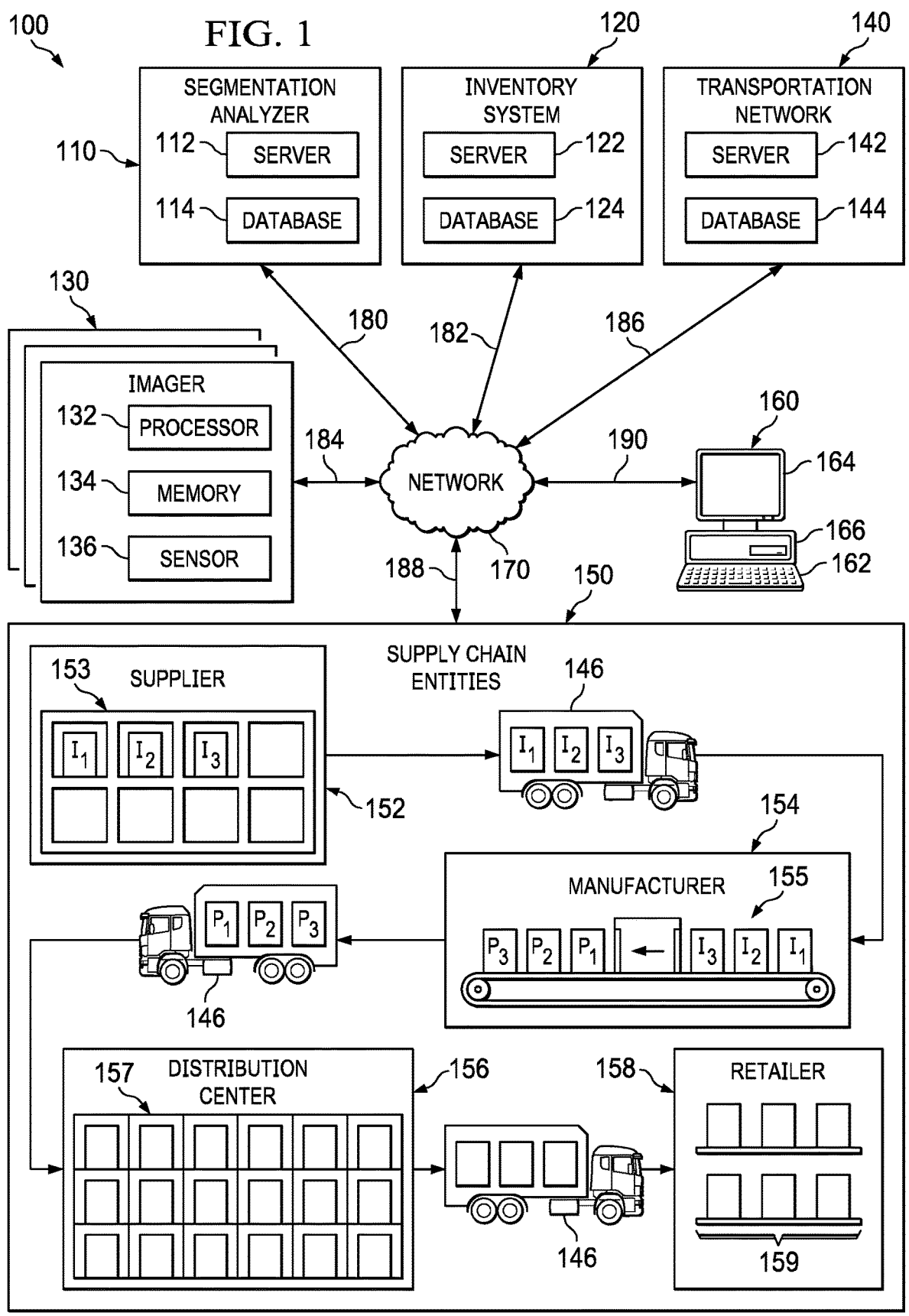
FIG. 1 illustrates an exemplary supply chain network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

One of the reasons companies struggle with creating differentiated services is because service offerings are a multi-dimensional problem dependent on competing priorities. Customers have different service priorities (e.g. higher fill rates at a premium price, extra services, stripped-down services, and the like) while also having different cost priorities (e.g. service package cost and the like). These challenges make it difficult to design a supply chain that offers consistent service to groups of customers.

Supply chain segmentation may aid companies to meet the needs of customers by customizing services to the customers' attributes, which often vary greatly. According to some embodiments, segmentation may be implemented in the logistics-phase of supply chain management by providing different package sizes and package assortments to customer with different shelf requirements. For example, a beauty care products distributor could send a large box of a single type of shampoo to a big-box retailer but send a smaller box containing an assortment of beauty care products to a mom-and-pop store with limited shelf and storage space. According to a further example, a vehicle manufacturer may set up additional production lines to meet the needs of customers that desire customization of the vehicle without slowing down a production line that produces fully-standard vehicles. For example, a vehicle manufacturer could create three production lines that run parallel to each other: a first production line for fully-customized vehicles, a second production line for slightly-customized vehicles, and a third production line for fully-standard vehicles. In this way, the service requirements of each customers' needs may be met without significant impact to other customers.

These segmentation techniques do not, however, indicate how to segment customers, how many segments to create, the characteristics of each segment, or how to implement the segments into a supply chain. In addition, these supply chain segmentation techniques use technical parameters, such as demand variability or profitability, but cannot tie back to customer service requirements, nor validate why the segmentation was based on certain parameters and not on others. The supply chain models created by these segmentation techniques are loosely defined and derived typically from product characteristics. No consistent approach exists to segment a supply chain and define the supply chain models in relationship to customer service objectives.

According to the following disclosure, embodiments disclose a value offering method of supply chain segmentation that defines supply chain models based, at least in part, on customer business models, key process indicator (KPI) trade-offs, and/or supply chain characteristics. The value offering method comprises an outside-in and customer-centric approach to determine the number and characteristics of supply chains required for a supply chain network. According to embodiments, the value offering method combines numerical analysis, such as from KPIs, with a deeper analysis of various customer business models and customer requirements to determine the number and type of supply chains needed for a segmented supply chain and readily visualize differences between each supply chain model. As explained below, this provides for, among other things, end-to-end supply chain segmentation to configure all supply chain planning and execution processes.

FIG. 1 illustrates an exemplary supply chain network 100, according to a first embodiment. Supply chain network 100 comprises segmentation analyzer 110, inventory system 120, one or more imagers 130, transportation network 140, one or more supply chain entities 150, computer 160, network 170, and communication links 180-190. Although a single segmentation analyzer 110, a single inventory system 120, one or more imagers 130, a single transportation network 140, one or more supply chain entities 150, a single computer 160, and a single network 170, are shown and described, embodiments contemplate any number of segmentation analyzers, inventory systems, imagers, transportation systems, supply chain entities, computers, or networks, according to particular needs.

In one embodiment, segmentation analyzer 110 comprises server 112 and database 114. According to embodiments, server 112 comprises one or more modules for segmenting supply chains according to various approaches. For example, and as discussed in more detail below, the one or more modules defines supply chain models based, at least in part, on customer business models, KPI trade-offs, and supply chain characteristics. In addition, these one or more modules defines clusters of customers and products and determines particular implementations of demand planning, supply and distribution planning, inventory management, allocation planning, and order fulfilment. Furthermore, the one or more modules configures supply chain processes with levers, enablers, and configuration options to enforce one or more supply chain models to customers, products, or customer-product clusters. Each of these modules will be discussed in more detail below.

Inventory system 120 comprises server 122 and database 124. Server 122 of inventory system 120 is configured to receive and transmit item data, including item identifiers, pricing data, attribute data, inventory levels, and other like data about one or more items at one or more locations in the supply chain network 100. Server 122 stores and retrieves item data from database 124 or from one or more locations in supply chain network 100.

One or more imagers 130 comprise an electronic device that receives imaging information from one or more sensors 136 or from one or more databases in supply chain network 100. According to embodiments, one or more imagers 130 comprise one or more processors 132, memory 134, one or more sensors 136, and may include any suitable input device, output device, fixed or removable computer-readable storage media, or the like. According to embodiments, one or more imagers 130 identify items near one or more sensors 136 and generate a mapping of the item in supply chain network 100. As explained in more detail below, inventory system 120 and transportation network 140 use the mapping of an item to locate the item in supply chain network 100. The location of the item is then used to coordinate the storage and transportation of items in supply chain network 100 to implement one or more supply chain models generated by segmentation analyzer 110.

One or more imagers 130 may comprise a mobile handheld device such as, for example, a smartphone, a tablet computer, a wireless device, or the like. In addition, or as an alternative, one or more imagers 130 comprise one or more networked electronic devices configured to transmit item identity information to one or more databases as an item passes by or is scanned by one or more imagers 130. This may include, for example, a stationary scanner located at one or more supply chain entities 150 that identifies items as the items pass near the scanner. One or more sensors 136 of one or more imagers 130 may comprise an imaging sensor, such as, a camera, scanner, electronic eye, photodiode, charged coupled device (CCD), or any other electronic or manual sensor that detects images of objects. In addition, or as an alternative, one or more sensors 136 may comprise a radio receiver and/or transmitter configured to read an electronic tag, such as, for example, a radio-frequency identification (RFID) tag. In addition, or as an alternative, each of the one or more items may be represented in supply chain network 100 by an identifier, including, for example, Stock-Keeping Unit (SKU), Universal Product Code (UPC), serial number, barcode, tag, RFID, or any other object that encodes identifying information. As discussed above, one or more imagers 130 may generate a mapping of one or more items in the supply chain network 100 by scanning an identifier or object associated with an item and identifying the item based, at least in part, on the scan.

Transportation network 140 comprises server 142 and database 144. According to embodiments, transportation network 140 directs one or more transportation vehicles 146 to ship one or more items between one or more supply chain entities 150, based, at least in part, on the supply chain models determined by segmentation analyzer 110. Transportation vehicles 146 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with segmentation analyzer 110, inventory system 120, one or more imagers 130, transportation network 140, and/or one or more supply chain entities 150 to identify the location of the transportation vehicle 146 and the location of any inventory or shipment located on the transportation vehicle 146. In addition to the supply chain models, the number of items shipped by transportation vehicles 146 in transportation network 140 may also be based, at least in part, on the number of items currently in stock at one or more supply chain entities 150, the number of items currently in transit in the transportation network 140, forecasted demand, a supply chain disruption, or the like.

As shown in FIG. 1, supply chain network 100 operates on one or more computers 160 that are integral to or separate from the hardware and/or software that support segmentation analyzer 110, inventory system 120, one or more imagers 130, transportation network 140, and one or more supply chain entities 150. Supply chain network 100 comprising segmentation analyzer 110, inventory system 120, one or more imagers 130, transportation network 140, and one or more supply chain entities 150 may operate on one or more computers that are integral to or separate from the hardware and/or software that support the segmentation analyzer 110, inventory system 120, one or more imagers 130, transportation network 140, and one or more supply chain entities 150. Computers 160 may include any suitable input device 162, such as a keypad, mouse, touch screen, microphone, or other device to input information. Output device 164 may convey information associated with the operation of supply chain network 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to supply chain network 100. Computer 160 may include one or more processors 166 and associated memory to execute instructions and manipulate information according to the operation of supply chain network 100 and any of the methods described herein. In addition, or as an alternative, embodiments contemplate executing the instructions on computer 160 that cause computer 160 to perform functions of the method. Further examples may also include articles of manufacture including tangible computer-readable media that have computer-readable instructions encoded thereon, and the instructions may comprise instructions to perform functions of the methods described herein. According to some embodiments, the functions and methods described in connection with one or more imagers 130 may be emulated by one or more modules configured to perform the functions and methods as described.

In addition, and as discussed herein, supply chain network 100 may comprise a cloud-based computing system having processing and storage devices at one or more locations, local to, or remote from segmentation analyzer 110, inventory system 120, one or more imagers 130, transportation network 140, and one or more supply chain entities 150. In addition, each of the one or more computers 140 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the inventory planner 110, inventory system 120, one or more imagers 130, transportation network 140, and one or more supply chain entities 150.

These one or more users may include, for example, a "manager" or a "planner" handling supply chain segmentation and/or one or more related tasks within the system. In addition, or as an alternative, these one or more users within the system may include, for example, one or more computers programmed to autonomously handle, among other things, one or more supply chain processes such as demand planning, supply and distribution planning, inventory management, allocation planning, order fulfilment, and adjustment of manufacturing and inventory levels at various stocking points and distribution centers, and/or one or more related tasks within supply chain network 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers 154. Suppliers 152 may comprise automated distribution systems 153 that automatically transport products to one or more manufacturers 154 based, at least in part, on one or more supply chain models determined by segmentation analyzer 110 and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in supply chain network 100, such as retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery 155 that produce products based, at least in part, on one or more supply chain models determined by segmentation analyzer 110 and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entities 150 in supply chain network 100 and store and transport the product for a second one or more supply chain entities 150. Distribution centers 156 may comprise automated warehousing systems 157 that automatically remove products from and place products into inventory based, at least in part, on one or more supply chain models determined by segmentation analyzer 110 and/or one or more other factors described herein.

Retailers 158 may be any suitable entity that obtains one or more products to sell to one or more customers. Retailers 158 may comprise any online or brick-and-mortar store, including stores with shelving systems 159. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 158 based on computer-generated instructions or automatically by machinery to place products in a desired location in retailers 158.

Although one or more supply chain entities 150 are shown and described as separate and distinct entities, the same entity may simultaneously act as any one of the one or more supply chain entities 150. For example, one or more supply chain entities 150 acting as a manufacturer can produce a product, and the same one or more supply chain entities 150 can act as a supplier to supply an item to itself or another one or more supply chain entities 150. Although one example of a supply chain network 100 is shown and described, embodiments contemplate any configuration of supply chain network 100, without departing from the scope described herein.

In one embodiment, segmentation analyzer 110 may be coupled with network 170 using communications link 180, which may be any wireline, wireless, or other link suitable to support data communications between segmentation analyzer 110 and network 170 during operation of supply chain network 100. Inventory system 120 may be coupled with network 170 using communications link 182, which may be any wireline, wireless, or other link suitable to support data communications between inventory system 120 and network 170 during operation of supply chain network 100. One or more imagers 130 are coupled with network 170 using communications link 184, which may be any wireline, wireless, or other link suitable to support data communications between one or more imagers 130 and network 170 during operation of distributed supply chain network 100. Transportation network 140 may be coupled with network 170 using communications link 186, which may be any wireline, wireless, or other link suitable to support data communications between transportation network 140 and network 170 during operation of supply chain network 100. One or more supply chain entities 150 may be coupled with network 170 using communications link 188, which may be any wireline, wireless, or other link suitable to support data communications between one or more supply chain entities 150 and network 170 during operation of supply chain network 100. Computer 160 may be coupled with network 170 using communications link 190, which may be any wireline, wireless, or other link suitable to support data communications between computer 160 and network 170 during operation of supply chain network 100.

Although communication links 180-190 are shown as generally coupling one or segmentation analyzer 110, inventory system 120, one or more imagers 130, transportation network 140, one or more supply chain entities 150, and computer 160 to network 170, any of segmentation analyzer 110, inventory system 120, one or more imagers 130, transportation network 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling segmentation analyzer 110, inventory system 120, one or more imagers 130, transportation network 140, one or more supply chain entities 150, and computer 160. For example, data may be maintained locally to, or externally of, segmentation analyzer 110, inventory system 120, one or more imagers 130, transportation network 140, one or more supply chain entities 150, and computer 160 and made available to one or more associated users of segmentation analyzer 110, inventory system 120, one or more imagers 130, transportation network 140, one or more supply chain entities 150, and computer 160 using network 170 or in any other appropriate manner. For example, data may be maintained in a cloud database at one or more locations external to segmentation analyzer 110, inventory system 120, one or more imagers 130, transportation network 140, one or more supply chain entities 150, and computer 160 and made available to one or more associated users of segmentation analyzer 110, inventory system 120, one or more imagers 130, transportation network 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, segmentation analyzer 110 may generate one or more supply chain models that determine the routing, storage, and handling for the inventory of one or more supply chain entities 150 in supply chain network 100. Furthermore, segmentation analyzer 110, inventory system 120, and/or transportation network 140 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of products based on one or more generated supply chain models, plans and policies and/or current inventory or production levels.

For example, the methods described herein may include computers receiving product data from automated machinery having at least one sensor and the product data corresponding to an item detected by one or more imagers 130 of the automated machinery. The received product data may include an image of the item, an identifier, as described above, and/or other product data associated with the item (dimensions, texture, estimated weight, and any other like data). The method may further include computers looking up the received product data in a database system associated with segmentation analyzer 110, inventory system 120, one or more imagers 130, and/or transportation network 140 to identify the item corresponding to the product data received from the automated machinery.

The computers may also receive, from the automated machinery, a current location of the identified item. Based on the identification of the item, computers may also identify (or alternatively generate) a first mapping in the database system, where the first mapping is associated with the current location of the item. Computers may also identify a second mapping in the database system, where the second mapping is associated with a past location of the identified item. Computers may also compare the first mapping and the second mapping to determine if the current location of the identified item in the first mapping is different than the past location of the identified item in the second mapping. Computers may then send instructions to the automated machinery based, as least in part, on one or more differences between the first mapping and the second mapping such as, for example, to locate item to add to or remove from an inventory of or shipment for one or more supply chain entities 150. In addition, or as an alternative, segmentation analyzer 110 monitors KPIs at one or more supply chain entities 150 and adjusts the orders and/or inventory of the one or more supply chain entities 150 based on the KPIs.

Figure 2:
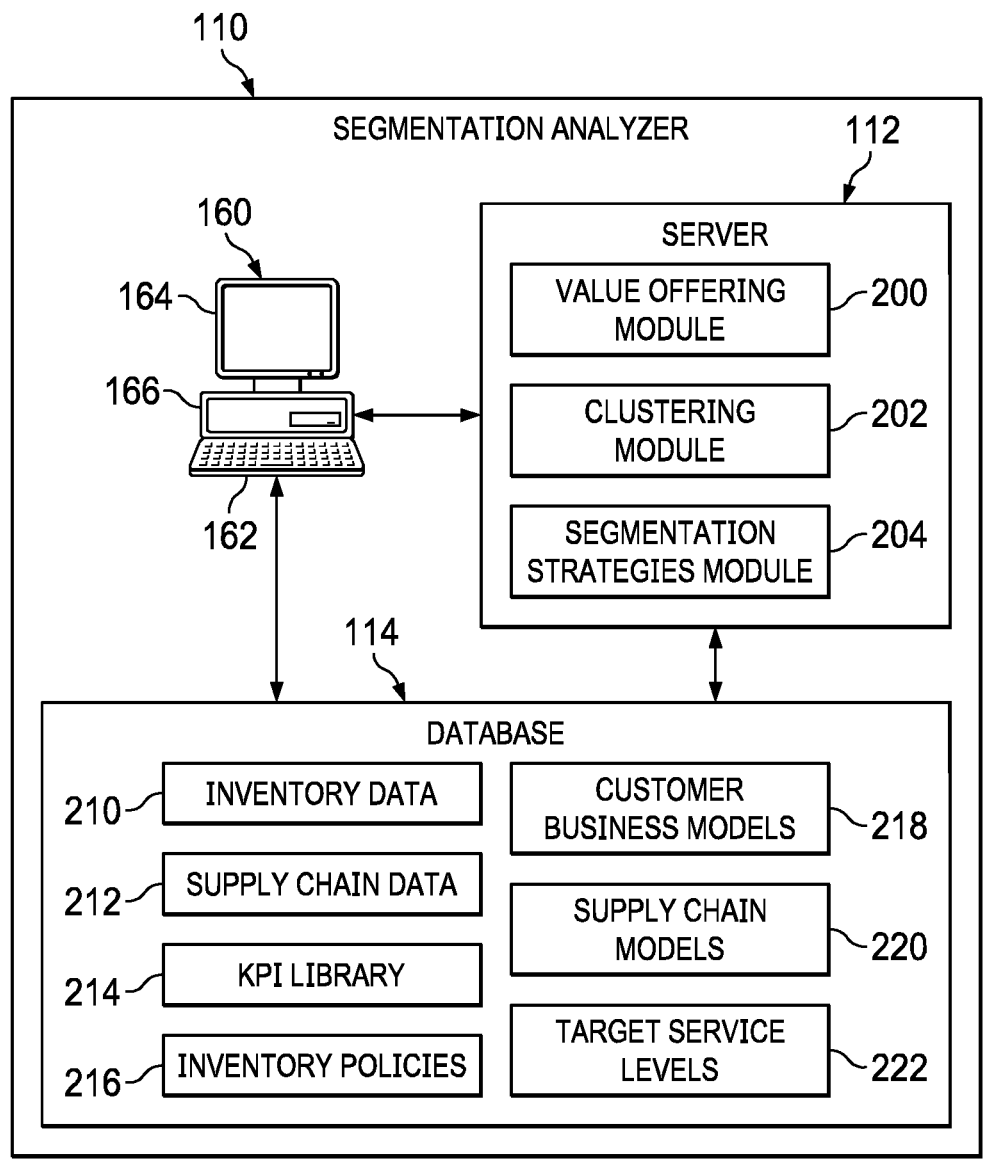
FIG. 2 illustrates the supply chain segmentation analyzer of FIG. 1 in greater detail, according to an embodiment.

FIG. 2 illustrates segmentation analyzer 110 of FIG. 1 in greater detail, according to an embodiment. As discussed above, segmentation analyzer 110 may comprise one or more computers 160 at one or more locations including associated input devices 162, output devices 164, non-transitory computer-readable storage media, processors 166, memory, or other components for receiving, processing, storing, and communicating information according to the operation of supply chain network 100. Additionally, segmentation analyzer 110 comprises server 112 and database 114. Although segmentation analyzer 110 is shown as comprising a single computer 160, a single server 112 and a single database 114, embodiments contemplate any suitable number of computers, servers, or databases internal to or externally coupled with segmentation analyzer 110. According to some embodiments, segmentation analyzer 110 may be located internal to one or more retailers 158 of one or more supply chain entities 150. In other embodiments, segmentation analyzer 110 may be located external to one or more retailers 158 of one or more supply chain entities 150 and may be located in for example, a corporate headquarters of the one or more retailers 158, according to particular needs.

Server 112 of segmentation analyzer 110 may comprise value offering module 200, clustering module 202, and segmentation strategies module 204.

Value offering module 200 defines supply chain models based, at least in part, on customer business models, KPI trade-offs, and supply chain characteristics. As explained in more detail below, value offering module 200 identifies the number and type of supply chain models with specific service packages that would meet customer and product priorities and which are aligned with the customers' and company's objectives. According to embodiments, value offering module 200 avoids overly complex customizations of other segmentation approaches. Instead of having a one-size-fits-all solution with lots of customizations, value offering module 200 generates a particular number of supply channels with the same number of specific customizations that meet all the needs of the company. According to some embodiments, each of the customizations include particular configurations of supply chain processes or user interfaces that support the supply channel.

Clustering module 202 defines customer clusters, product clusters, and customer-product combination clusters (customer-product clusters) and determines particular implementations of demand planning, supply and distribution planning, inventory management, allocation planning, and order fulfilment, including resolving priority conflicts across a segmented supply chain.

Segmentation strategies module 204 configures supply chain processes with levers, enablers, and configuration options to enforce one or more supply chain models to customers, products, or customer-product clusters.

Although server 112 is shown and described as comprising a single value offering module 200, a single clustering module 202, and a single segmentation strategies module 204, embodiments contemplate any suitable number or combination of these located at one or more locations, local to, or remote from segmentation analyzer 110, such as on multiple servers or computers at any location in supply chain network 100.

Database 114 of segmentation analyzer 110 may comprise one or more databases or other data storage arrangement at one or more locations, local to, or remote from, server 112. Database 114 comprises, for example, inventory data 210, supply chain data 212, KPI library data 214, inventory policies 216, customer business models 218, supply chain models 220, and target service levels 222. Although, database 114 is shown and described as comprising inventory data 210, supply chain data 212, KPI library data 214, inventory policies 216, customer business models 218, supply chain models 220, and target service levels 222, embodiments contemplate any suitable number or combination of these, located at one or more locations, local to, or remote from, segmentation analyzer 110 according to particular needs.

Inventory data 210 of database 114 may comprise any data relating to current or projected inventory quantities or states. For example, inventory data 210 may comprise the current level of inventory for each item at one or more stocking points across supply chain network 100. In addition, inventory data 210 may comprise order rules that describe one or more rules or limits on setting an inventory policy, including, but not limited to, a minimum order quantity, a maximum order quantity, a discount, and a step-size order quantity, and batch quantity rules. According to some embodiments, segmentation analyzer 110 accesses and stores inventory data 210 in database 114, which may be used by segmentation analyzer 110 to place orders, set inventory levels at one or more stocking points, initiate manufacturing of one or more components, or the like. In addition, or as an alternative, inventory data 210 may be updated by receiving current item quantities, mappings, or locations from inventory system 120, one or more imagers 130, and/or transportation system 140.

Supply chain data 212 may comprise any data of the one or more supply chain entities 150 including, for example, item data, identifiers, metadata (comprising dimensions, hierarchies, levels, members, attributes, and member attribute values), fact data (comprising measure values for combinations of members), business constraints, goals and objectives of one or more supply chain entities 150.

KPI library 214 comprises one or more KPIs that are currently measured by the company and/or KPIs that may be measured by the company with existing IT solutions with consideration given to the objectives of any ongoing business transformation projects. According to embodiments, KPIs in KPI library 214 are identified from a standard reference framework for supply chain processes such as those from, for example, the Supply Chain Operational Reference Model (SCOR), American Production and Inventory Control Society (APICS), American Quality and Productivity Centre (AQPC), or the Gartner KPI framework. Although particular frameworks have been identified, embodiments contemplate any suitable framework or standards, according to particular needs.

Inventory policies 216 of database 114 may comprise any suitable inventory policy describing the reorder point and target quantity, or other inventory policy parameters that set rules for segmentation analyzer 110 to manage and reorder inventory based, at least in part, on customer business models, KPI trade-offs, and supply chain characteristics. According to embodiments, inventory policies 216 may be used by segmentation analyzer 110 to determine a nostockout probability, fill rate, cost, or other like determination of KPI targets, as described below.

Customer business models 218 comprise groups of customers, channels, and/or product concepts based on one or more customer attributes. As explained in more detail below, customer business models may comprise groups which share a particular set of customer attributes. These customer attributes may include, for example, ordering behavior, order pattern, leadtime expectations, product or packaging adjustments, and unique or particular service requests. More particular examples of customer attributes include: having limited or no storage space, requesting one or more suppliers 152 to keep consignment inventory, selling products from a competitor, purchasing items ahead of season, and placing large orders.

Supply chain models 220 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 220 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model.

Target service level data 222 of database 114 may be calculated by segmentation analyzer 110 from a forecasted demand to ensure that a service level of one or more supply chain entities 150 is met with a certain probability. Target service level data 222 may comprise any suitable service level target. According to some embodiments, one or more supply chain entities 150 set a service level at 95%, meaning the one or more supply chain entities 150 will set the desired inventory stock level at a level that meets demand 95% of the time. Although, a particular service level target and percentage is described; embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, segmentation analyzer 110 may determine a replenishment order according to one or more replenishment rules, which, among other things, indicates to one or more supply chain entities 150 to determine or receive inventory to replace the depleted inventory.

Figure 3:
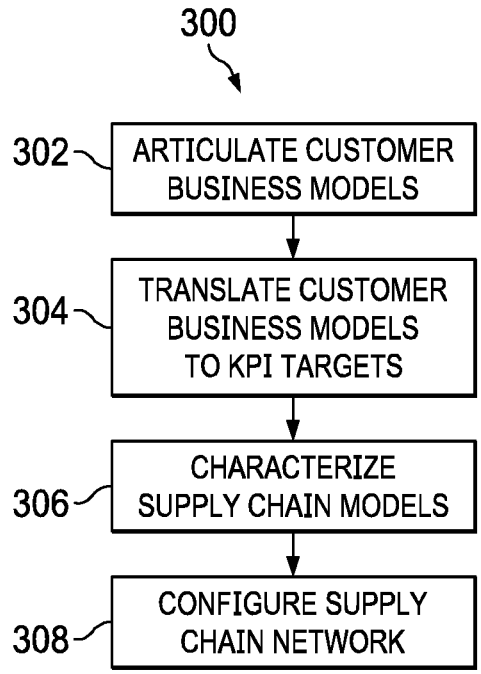
FIG. 3 illustrates an exemplary value offering method of the value offering module of the supply chain segmentation analyzer of FIG. 2, according to an embodiment.

FIG. 3 illustrates an exemplary value offering method 300 of value offering module 200 of the segmentation analyzer 110, according to an embodiment. Value offering method 300 comprises one or more activities, which although described in a particular order may be performed in one or more permutations, according to particular needs.

According to embodiments, value offering method 300 identifies the number and type of supply chain models with specific service packages that would meet customer and product priorities and which are aligned with the customer and the company's objectives. According to embodiments, value offering method 300 limits the complexity of the solution by proposing a finite number of supply chain models, specific for a certain industry, which are derived via a thorough analysis of customer and product attributes. This results in value offering method 300 generating a finite number of supply chain models with specific service packages and assigning a supply chain model to each customer to clearly articulate the service offering by customer and product. In general, each supply chain model comprises a configuration for a particular customer and product, (including, for example, customer business models, KPI trade-offs, and/or supply chain characteristics) that configures attributes of supply chain network 100 (including inventory system 120, one or more imagers 130, transportation network 140, and one or more supply chain entities 150) to support each supply channel.

At action 302 of value offering method 300, value offering module 200 articulates customer business models by analyzing characteristics of customers, clustering customers according to identified characteristics, associating customer clusters with customer business models, and selecting supply chain models for each customer business model. In addition, value offering module 200 may articulate customer business models according to an articulate customer business models method 400 (see FIG. 4).

At action 304, value offering module 200 translates customer business models to KPI targets by identifying KPIs and configuring the supply chain models to meet the KPIs of customers associated with the particular supply chain model based, at least in part, on customer business models and supply chain models of action 302. As described in detail below, each supply chain model may be associated with a set of KPIs and/or trade-offs between a set of KPIs. Each supply chain model may, for example, be associated with different KPI targets, including, for example, service level, lead-time, cost, and the like. In addition, value offering module 200 may translate customer business models to KPI targets according to a translating customer business models to KPI targets method 1000 (see FIG. 10).

At action 306, value offering module 200 characterizes each of the supply chain models. According to embodiments, characterizing supply chain models comprises assigning a minimum, a maximum, or a range of values to each KPI target in each supply chain model. In addition, value offering module 200 may define supply chain models to support customer business models according to a defining supply chain models to support customer business models method 1700 (see FIG. 17).

At action 308, value offering module 200 configures supply chain network 100 according to the customer business models, KPI trade-offs, and/or supply chain characteristics. For example, based on the customer business models, KPI trade-offs, and/or supply chain characteristics, the supply chain may be altered from a single static supply chain to more than one active supply chains that require, for example, changing the number of products offered or the transportation of the products. In addition, value offering module 200 alters all modules of supply chain planning, end-to-end, beginning with, for example, demand planning and ending with, for example, order promising. This may include, for example, altering all the planning processes and execution processes and configure them differently for each supply chain model.

Each of the actions of the value offering method 300 are explained in more detail below.

1. Articulating Customer Business Model

Figure 4:
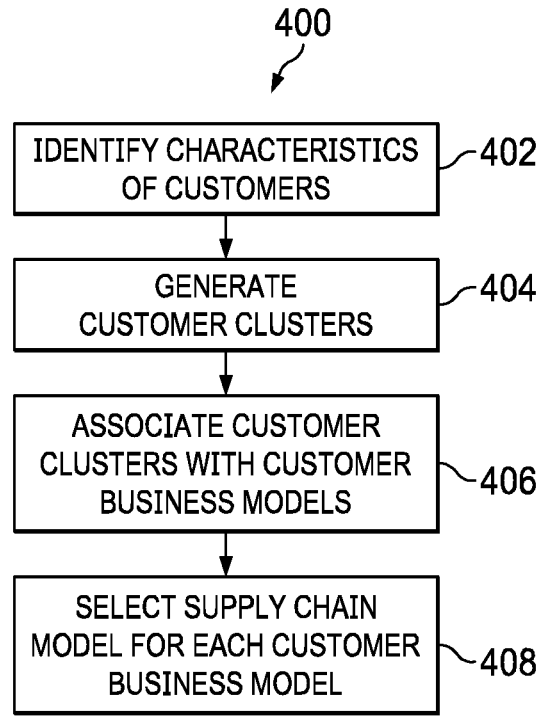
FIG. 4 illustrates an exemplary articulate customer business models method, according to an embodiment.

At action 302 of FIG. 3, value offering module 200 may articulate customer business models according to an articulate customer business models method. FIG. 4 illustrates an exemplary articulate customer business models method 400, according to an embodiment. Articulating customer business models method 400 begins at action 402 where value offering module 200 analyzes customers to identify characteristics of the customers. The identified characteristics will be used to generate customer business models that represent different ways of servicing customers. Characteristics that may be used to determine the customer business models include, for example, the presence or absence of contractor agreements, the size of the customer order, the lead time of the customer orders, the seasonality of the customer orders, or any other characteristic that may be used to differentiate service requirements of customers.

At action 404, value offering module 200 groups customers into customer clusters. Customer clusters comprise groups of customers having similar service requirements. Each customer has particular service requirements, and each company has a finite number of approaches to service those customers. Value offering module 200 groups customers with similar service requirements to offer similar services to those customers.

At action 406, value offering module 200 associates customer clusters with customer business models. Customer business models represent different ways of servicing customers. The customer business models may be determined by identifying characteristics associated with each of the customers that require the customers to be serviced differently by the company. Based on characteristics associated with the customers, business models are generated that fulfill the service requirements of the customers.

At action 408, value offering module 200 selects a supply chain model that fulfills the service requirements of each customer business model. The customer business models are translated into supply chain models with industry-specific characteristics based on the customer and product attributes identified in the customer business model. In one embodiment, value offering method 300 of FIG. 3 generates five supply chain models; however, embodiments contemplate any number and type of supply chain models, according to particular needs.

As an example only and as discussed below in more detail, a first tire manufacturer may have four supply chain models and a second tire manufacturer may have five supply chain models. The number and type of supply chain models is industry-agnostic and determined by customer and product attributes and the required service package for each company. In addition, or as an alternative, supply chain segmentation applies to many types of customers, companies, and industries. Although value offering method 400 is explained in reference to the tire industry below, the disclosed methodologies are applicable for retail products, telecommunications, chemical manufacturers, and other like industries.

Figure 5:
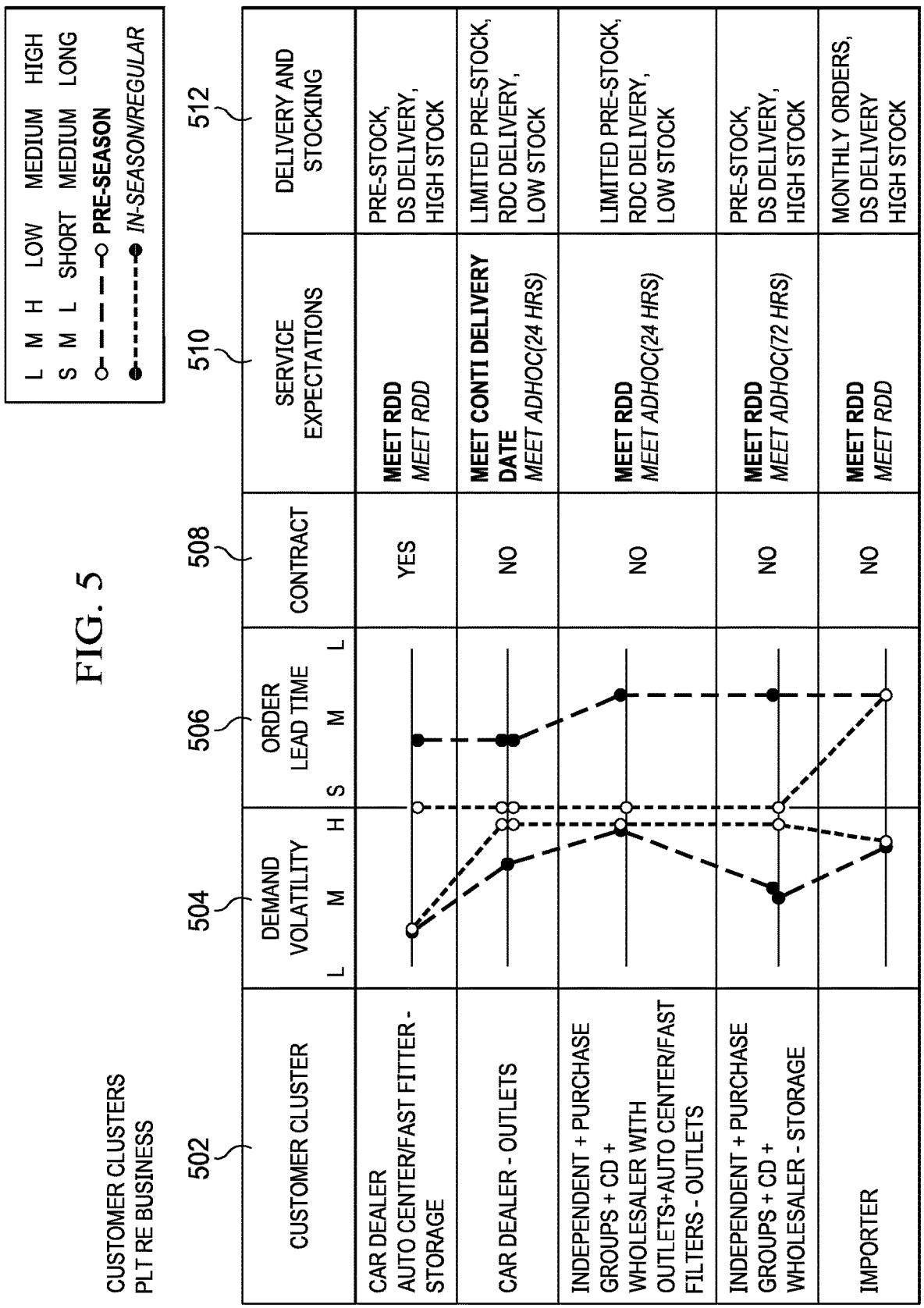
FIG. 5 illustrates customer clusters and business requirements for an exemplary tire company for passenger and light truck vehicle tires, according to an embodiment.

To further explain the articulate customer business models method 400, an example is now given. In the following example, FIG. 5 illustrates customer clusters and business requirements for an exemplary tire company for passenger and light truck vehicle tires, according to an embodiment. Each customer cluster 502 may have different business requirements based on, for example, demand volatility 504, order lead time 506, contracts 508, service expectations 510, and delivery and stocking requirements 512. According to an embodiment, demand volatility 504 may comprise, for example, low, medium, or high demand volatility, order lead time 506 may comprise short, medium, or long lead time, contracts 508 may be present (yes) or absent (no), service expectations 510 may comprise any combination of time period (24 hours, 72 hours, or the like), ad hoc service, meet requested delivery date (RDD) or meet confirmed delivery date (CDD), delivery and stocking requirements 512 may comprise, for example, direct shipment or regional distribution centers (DS/RDC) delivery, low stock, med-high stock, DS delivery, pre-stock, limited pre-stock, RDC delivery, monthly orders, and the like. These different business requirements may be related to the customers' business needs, rules, and attributes including, for example, available storage space.

Continuing with the above example and to illustrate the business requirements for customer clusters 502, a further example is now given. A supply chain entity 120, such as a car dealer or a retailer, typically does not have much storage space for tires. However, if a company does not supply tires quickly to the car dealer or retailer, they will purchase tires from a competitor company. Therefore, car dealers and retailers typically need immediate, ad hoc availability of tires from the company. In addition or as an alternative, in the tire industry different supply chain entities 150, such as, for example, wholesalers and car dealers, are serviced differently from each other. Similarly, products, such as commercial tires, are supplied differently from tires for more professional purposes like tires for fleet, military, mining, or other like purposes.

Figure 6:
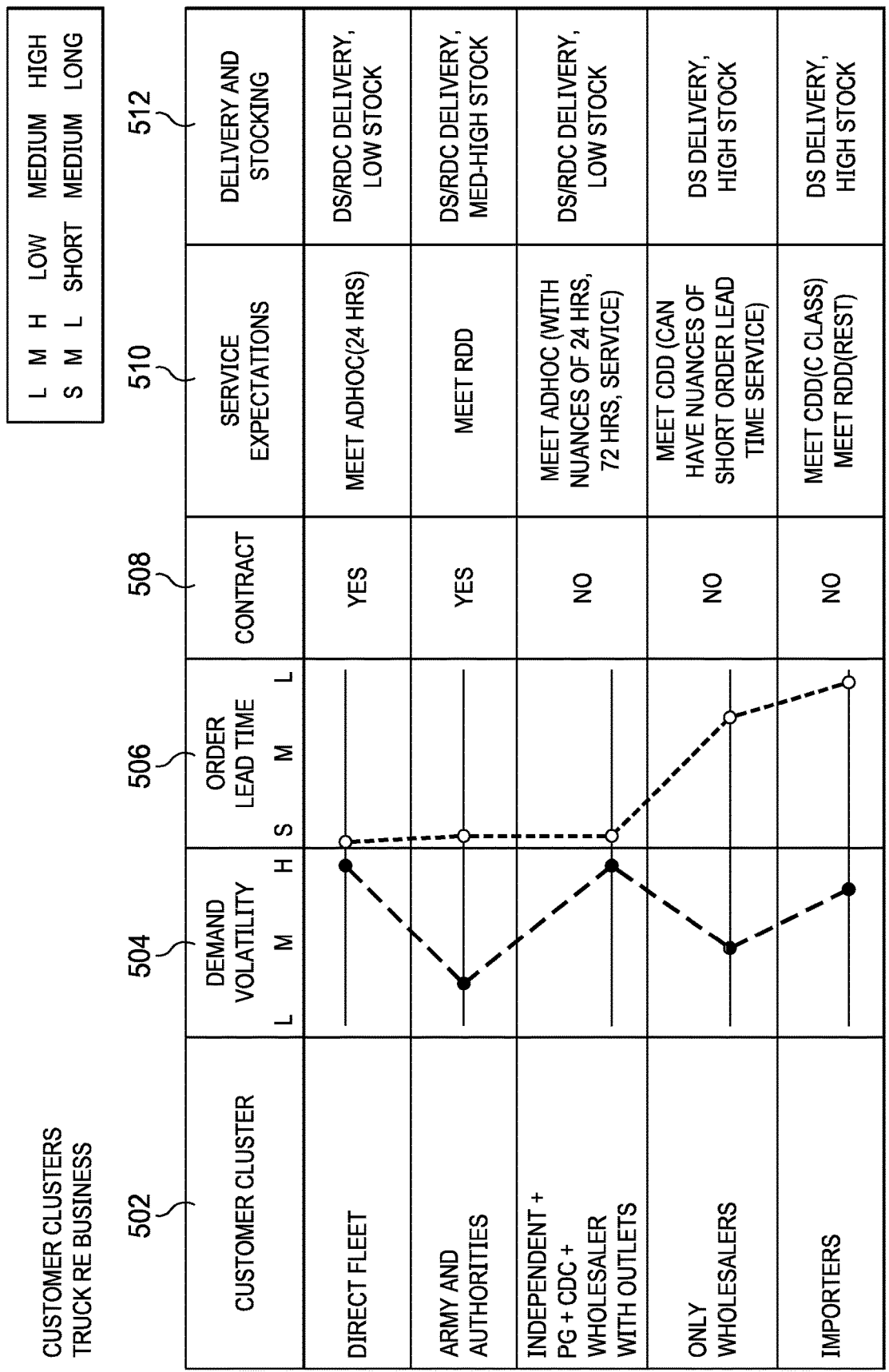
FIG. 6 illustrates customer clusters and business requirements for an exemplary tire company for heavy truck tires, according to an embodiment.

FIG. 6 illustrates customer clusters and business requirements for an exemplary tire company for heavy truck tires, according to an embodiment. As discussed above and as an example, in the tire industry the customer requirements for heavy truck tires may be different for the same type of customers for passenger and light truck vehicle tires. Accordingly, customers that are in the same customer cluster 502 for passenger and light truck vehicle tires are not in the same cluster for heavy truck tires because the requirements for the customers may be different based on different products. After customers are clustered according to similar business and service requirements, customer clusters 502 are associated with customer business models, and a supply chain model is selected for each of the customer business models.

FIG. 7 illustrates exemplary customer business models 702 and supply chain models 704 for customer clusters 706a-706c of an exemplary tire company for passenger and light truck vehicle tires, as discussed above, according to an embodiment. Continuing with the previous example, the exemplary tire company may have customers that include car dealerships, distributors, wholesalers, e-commerce businesses, car manufacturers, controlled distribution entities (CD), and the like. In addition, as discussed above, customers are grouped into various customer clusters 706a-706c.

Each customer cluster 706a-706c is associated with a customer business model 702. In this example, three customer business models 702 are generated: the collaborative customer business model, the ad-hoc customer business model, and the standard customer business model. In the illustrated embodiments, a collaborative customer business model may be associated with customers (car dealer (complete portfolio), auto center and fast fitter (with storage) and large wholesaler and important importers) in a customer cluster 706a that have completely customized contractual arrangements with the exemplary tire manufacturer. In this case, if the tire manufacturer does not adhere to the contractual arrangements, they may face penalties. Therefore, the collaborative customer business model is chosen because it is associated with key characteristics 712 that meet service requirements 714 of customer cluster 706a.

Continuing with the illustrated embodiments, an ad-hoc customer business model may be associated with customer cluster 706b of customers that, for example, do not have large or any storage facilities. For customers in customer cluster 706b associated with the ad-hoc customer business model, not receiving an order of tires the day the order is placed is extremely problematic because these customers receive orders from their own customers usually the same day. Accordingly, these customers associated with the ad-hoc customer business model are highly sensitive to delivery waiting times.

Continuing with this example, the standard customer business model is associated with a customer cluster 706c which contains importers, wholesalers, and purchase groups (including both storage and outlet purchase groups). The standard customer business model is chosen with key characteristics 712 that meet the service requirements 714 of the customers in customer cluster 706c. For example, the service requirements 714 of a wholesaler may, for example, include buying large quantities of tires with long lead times and having warehouses that can store large quantities of tires. A wholesaler may not have high requirements when it comes to waiting time, because a wholesaler will typically have extra tires in their own warehouse prior to receiving a new order.

As discussed above, heavy truck tires may be handled by a different division of a tire manufacturer, and therefore the customer business models associated with these customers may be different than the customer business models for passenger and light vehicle tires.

FIG. 8 illustrates exemplary customer business models and supply chain models for customer clusters of an exemplary tire manufacturer of heavy truck tires, according to an embodiment. In this example, the customer business models identified for the customers of the heavy truck tire division are the same customer business models as the passenger and light truck vehicle division. However, the customers placed in the different customer clusters and associated with the customer business models are different because the customers for the heavy truck tire division have different characteristics and service requirements as the same customers for the passenger and light vehicle tire division. For example, the collaborative customer business model was associated in the passenger and light truck vehicle division with car dealers, auto centers, fast fitters, large wholesalers, and the like. However, the collaborative model for the heavy truck tire division is associated with direct fleet, the military and authorities, and large importers and wholesalers. In other words, a different group of customers may have the same customer business model depending on the particular division of the business or the product that is sold.

After each customer cluster is associated with a customer business model, each customer business model is associated with a supply chain model. Each supply chain model represents changes to the supply chain that will meet the needs of the customer associated with the customer business model including key characteristics and service offerings.

Figure 9:
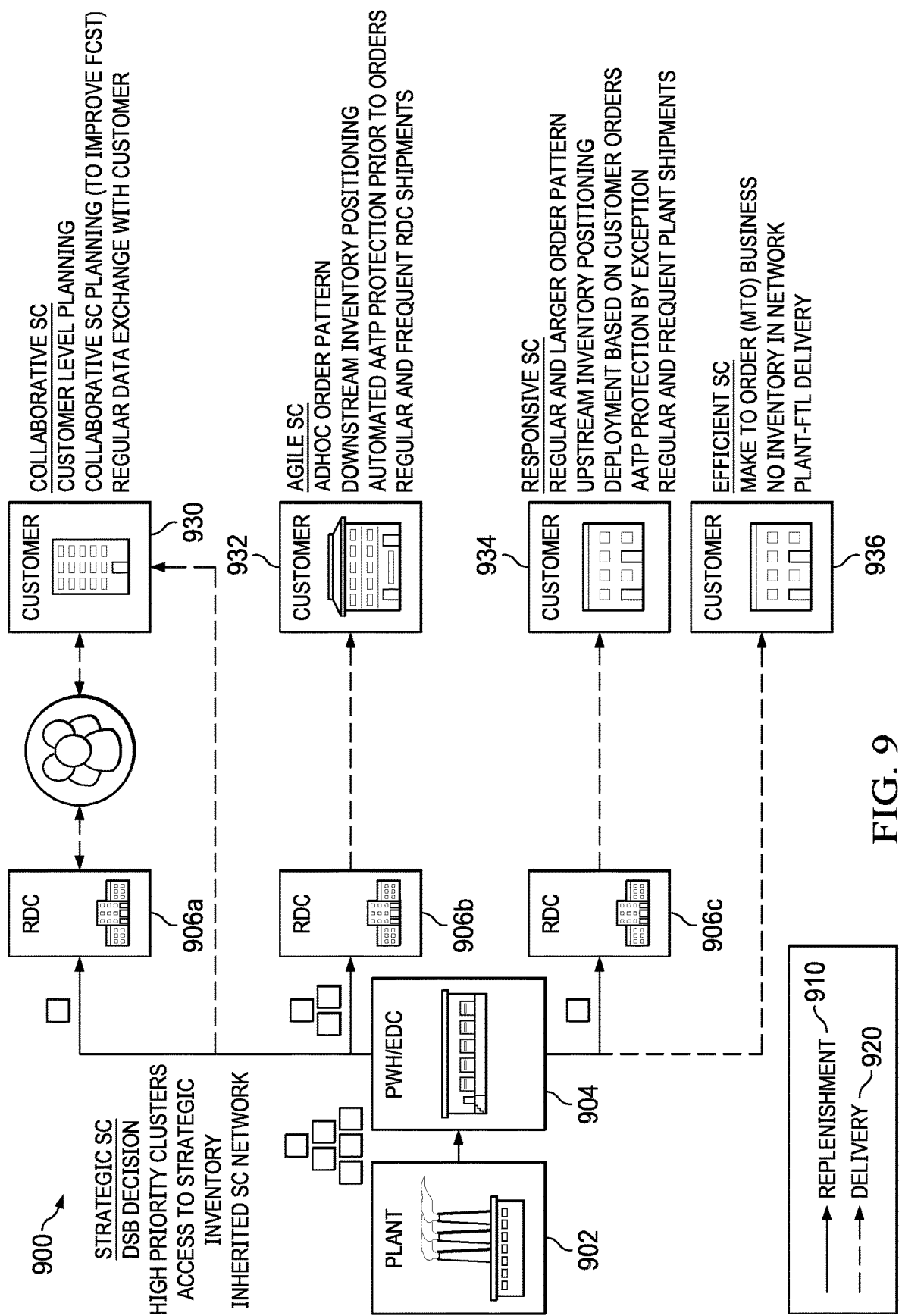
FIG. 9 illustrates a simplified segmented supply chain network with various exemplary supply chain models, according to an embodiment.

FIG. 9 illustrates a simplified segmented supply chain network 900 with various exemplary supply chain models, according to an embodiment. Each supply chain model comprises key characteristics that determine a particular service offering for customers associated with that supply chain model. Five exemplary supply chain models are illustrated: efficient, responsive, agile, collaborative, and strategic. Each delivers a different service package for specific types of customers and products. An efficient supply chain model may be associated with cost effective service packages (such as, for example, Make-To-Order (MTO)). A responsive supply chain model may be associated with a standard service package (such as, for example, a default service level). An agile supply chain model may be associated with a premium service package. A collaborative supply chain model may be associated with a customer collaboration service package. A strategic supply chain model may be associated with a regional importance service package. Each of the supply chain models determines how a customer will be serviced in the segmented supply chain network 900.

As illustrated in the simplified segmented supply chain network 900, a manufacturing plant 902 of manufacturer 154 may be associated with a plant warehouse (PWH), which indicates a dedicated warehouse associated with manufacturing plant 902, and/or European Distribution Center (EDC) 904. Manufacturer 154 may store large amounts of inventory in the PWH/EDC 904. This inventory may be used by customers associated with the strategic supply chain model. Several Regional Distribution Centers (RDC) 906a-906c may receive replenishment of inventory from the PWH/EDC 904. The inventory may be replenished in different amounts, as represented by the differing number of boxes next to each RDC 906a-906c. Replenishment is indicated by solid line 910. Four exemplary customers 930-936 receive inventory from the RDC 906a-906c or directly from PWH/EDC 904 as indicated by dashed line 920. Each of these customers 930-936 is associated with a different supply chain model, which determines how the customer will be supplied with inventory from different locations in segmented supply chain network 900. To further explain how supply chain models determine customer service levels, several examples are now given.

By way of a first example, a collaborative supply chain model has a characteristic of regular data exchange with customers 930. This may mean that customers 930 share a demand forecast, replenishment data, and inventory levels each day with the supplying company. Sharing the demand forecast, replenishment data, and inventory levels with the company allows the company to collaborate with customer 930 to ensure that the company's production and shipping plans will meet the demand forecast and inventory levels for customers 930 associated with the collaborative supply chain model at a lower cost and with less safety stock. Based at least in part on the increased visibility, the company may anticipate replenishments, deliveries, or even production to meet sudden changes in the demand forecasts and inventory levels of customers 930.

By way of a second example, an efficient supply chain model made be associated with a made-to-order business. For these customers 936, manufacturer 154 may ship large quantities directly from a manufacturing plant 902 to the made-to-order business without storing any inventory in the segmented supply chain network 900, leading to significant cost savings in production and storage.

By way of a third example, customers 932-934 associated with an agile supply chain model and responsive supply chain model may receive inventory from one or more RDCs 906b-906c. For customer 932 associated with the agile supply chain model, orders are placed in an ad-hoc pattern which requires RDC 906b to keep a large inventory closer to customers 932 and only use PWH/EDC 904 if order lead-times allow such a delay. In contrast, for the responsive supply chain model, customers 934 order at regular intervals in large quantities which allows RDC 906c to keep a lower inventory and instead provides for regular and frequent full truckload plant shipments directly from PWH/EDC 904.

2. Translating Customer Business Models to KPI targets

Figure 10:
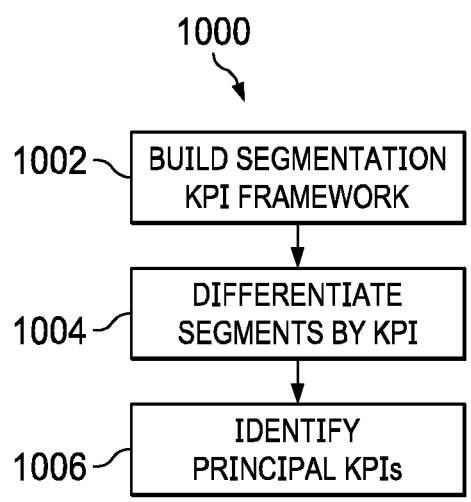
FIG. 10 illustrates a translating customer business models to KPI targets method, according to an embodiment.

At action 304 of FIG. 3, value offering module 200 may translate customer business models to KPI targets according to a translating customer business models to KPI targets method. FIG. 10 illustrates a translating customer business models to KPI targets method 1000, according to an embodiment. Based on the identified customer business models and supply chain models, value offering module 200 identifies KPIs and configures the supply chain models to meet the KPIs of customers associated with each supply chain model. Each supply chain model may be associated with a set of KPIs and clear trade-offs between these KPIs. Each supply chain model may have a different KPI target in terms of, for example, service, lead-time, cost, and the like.

Figure 11:
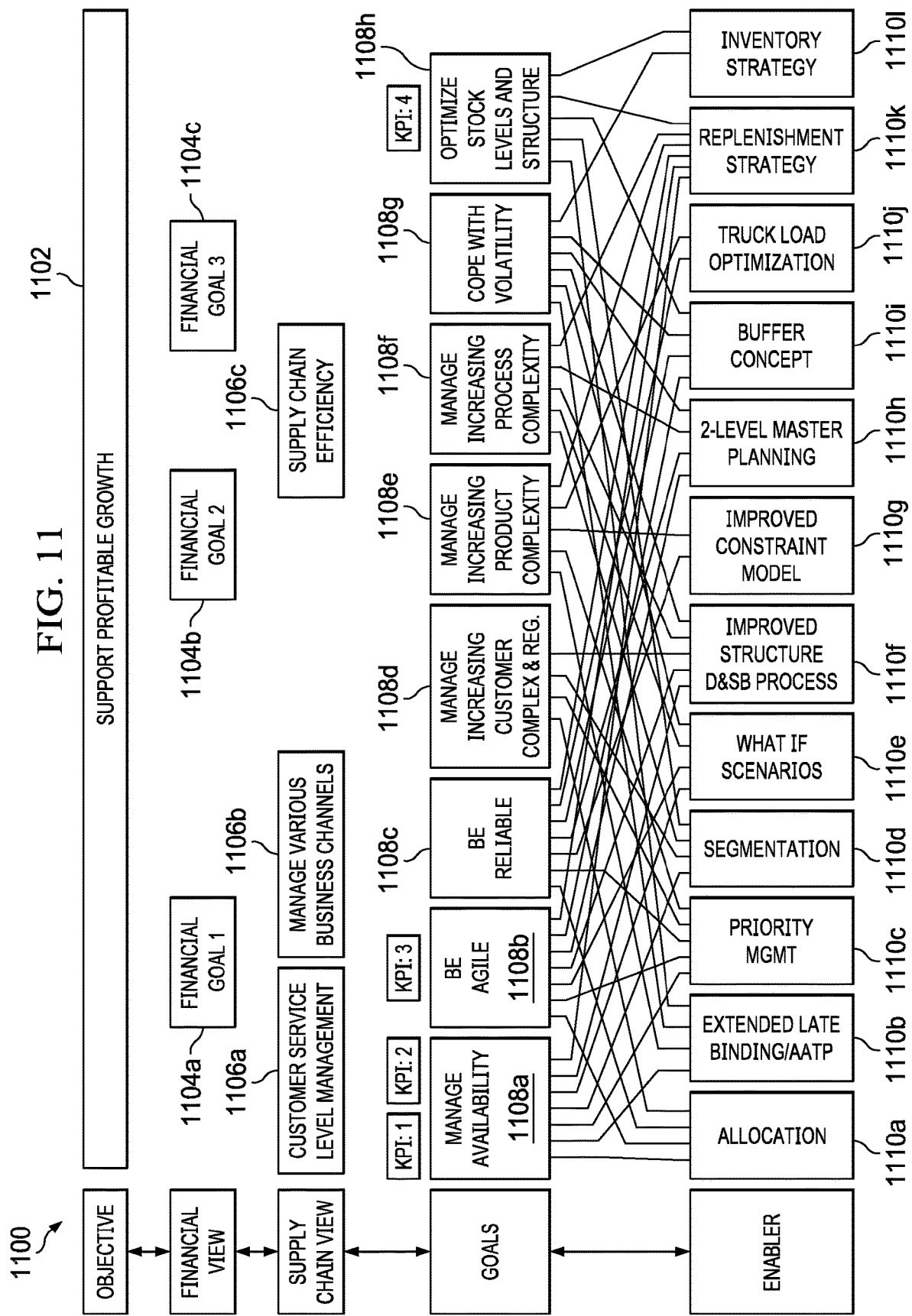
FIG. 11 illustrates an exemplary value tree, according to an embodiment.

At action 1002, value offering module 200 builds a segmentation KPI framework. A segmentation KPI framework comprises a value tree and a goal tree 1200 (see FIG. 12). FIG. 11 illustrates an exemplary value tree 1100, according to an embodiment. Companies may produce value trees 1100 in order to support their business and supply chain strategies with a business case justifying the large investments to support large business transformation projects and the related software investments, including value drivers and how these translate into operational and financial metric improvements. Value tree 1100 comprises objective 1102, financial goals 1104a-1104c, supply chain metrics 1106a-1106c, goals 1108a-1108h, and enablers 1110a-1110l.

Figure 12:
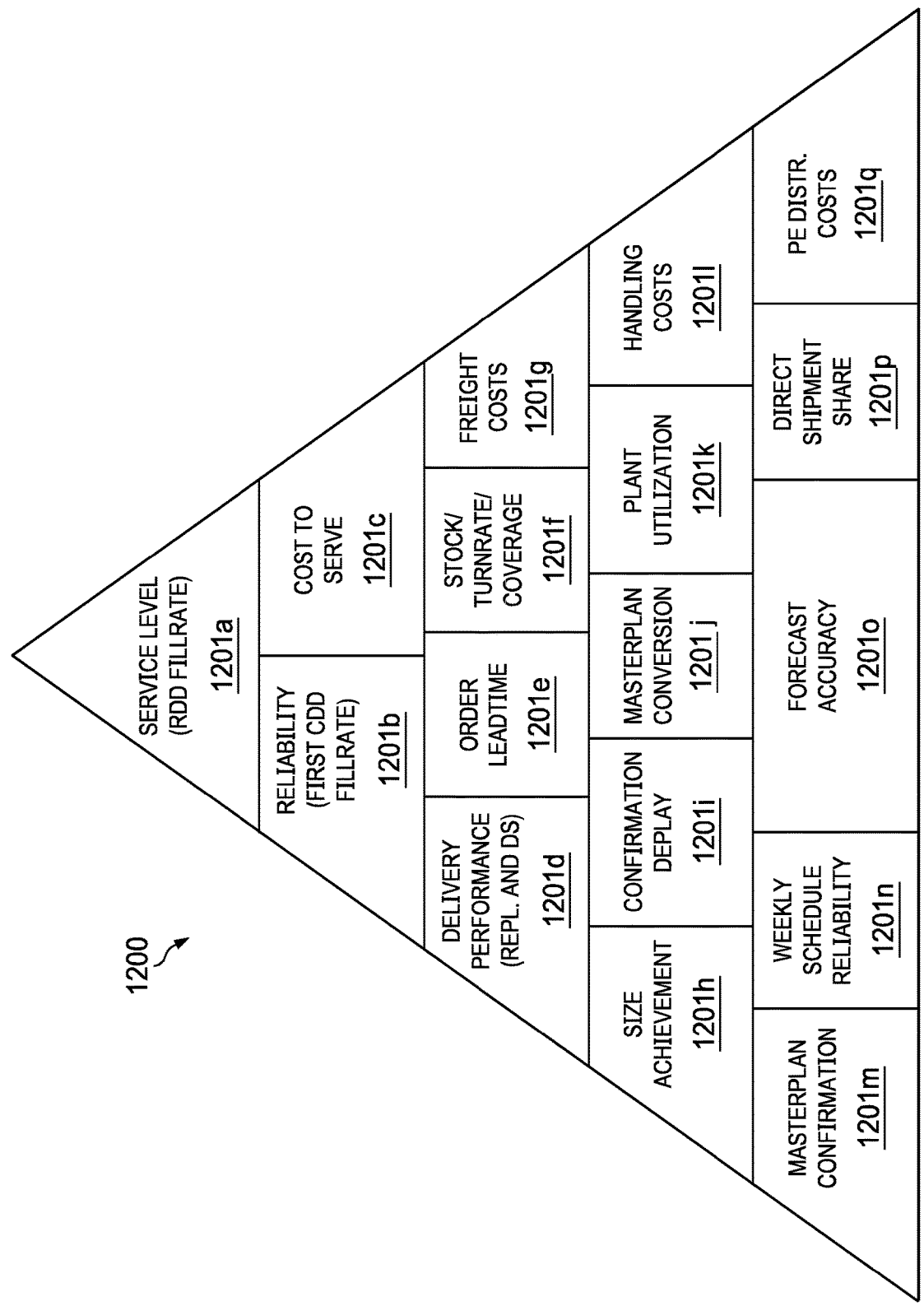
FIG. 12 illustrates an exemplary goal tree, according to an embodiment.

FIG. 12 illustrates an exemplary goal tree 1200, according to an embodiment. Value offering module 200 may identify and build a goal tree 1200 of KPIs 1201a-1201q from KPI library 214. Additionally, although goal tree 1200 is illustrated as a triangle or pyramid, embodiments contemplate any shape, according to particular needs. The shape may be a triangle for customers of one company, or a square for customers of another company. Additionally, the KPIs 1201a-1201q that are illustrated in goal tree 1200 or that are chosen to drive customer preferences, may be any KPI according to particular needs. According to some embodiments, the chosen KPIs minimally reflect a trade-off between service, cost and lead-time.

Returning to value tree 1100, value offering module 200 determines KPIs 1112a-1112d that support goals 1108a-1108h of the company. According to embodiments, these KPIs 1112a-1112d demonstrate the expected performance improvements of the supply chains of the company, supporting the business case, and justifying the proposed strategic business transformation programs. Although a particular number of objectives 1102, financial goals 1104, supply chain metrics 1106, goals 1108, enablers 1110, and KPIs 1112 are illustrated, embodiments contemplate any number of objectives 1102, financial goals 1104, supply chain metrics 1106, goals 1108, enablers 1110, and KPIs 1112, according to particular needs.

As explained in more detail below, translating the customer business models to KPI targets comprises generating goal tree 1200 from value tree 1100. Goal tree 1200 summarizes supply chain improvement targets for a company. KPI targets in isolation are often conflicting and cannot be translated into a differentiated service offering. In order to generate goal tree 1200, various KPIs are analyzed in relationship to each other to identify which service-cost trade-offs are most suitable.

At action 1004, value offering module 200 differentiates segments by KPIs 1201a-1201q. Differentiating segments by KPIs 1201a-1201q comprises assigning a target level to KPI targets in goal trees 1200 to ensure that goal tree 1200 for each supply chain model is different. According to some embodiments, this may comprise color-coding KPIs 1201a-1201q in goal tree 1200 according to target level to show KPIs 1201a-1201q that are different.

FIGS. 13-17 illustrate goal trees 1200 shaded for various KPIs 1201a-1201q for exemplary supply chain models. Color-coding the KPIs 1201a-1201q according to target level may comprise for example, better than average 1302, average 1304, worse than average 1306, or not applicable 1308. Because supply chain models identify different service requirements, goal trees 1200 associated with each supply chain model may have different color-coding that represents the importance of each KPI target to each supply chain model.

Figure 13:
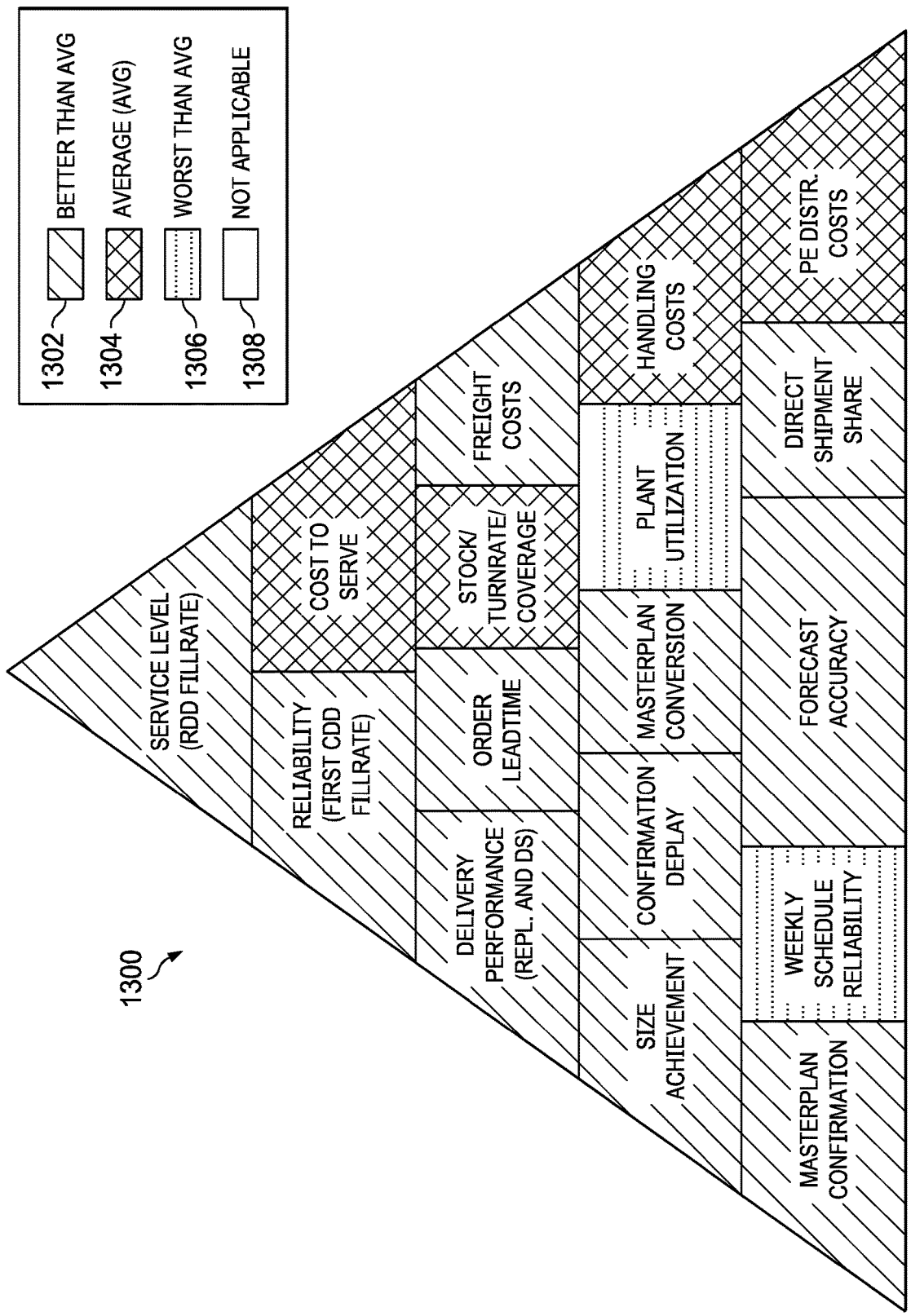
FIGS. 13-17 illustrate goal trees shaded for various KPIs for exemplary supply chain models.
Figure 14:
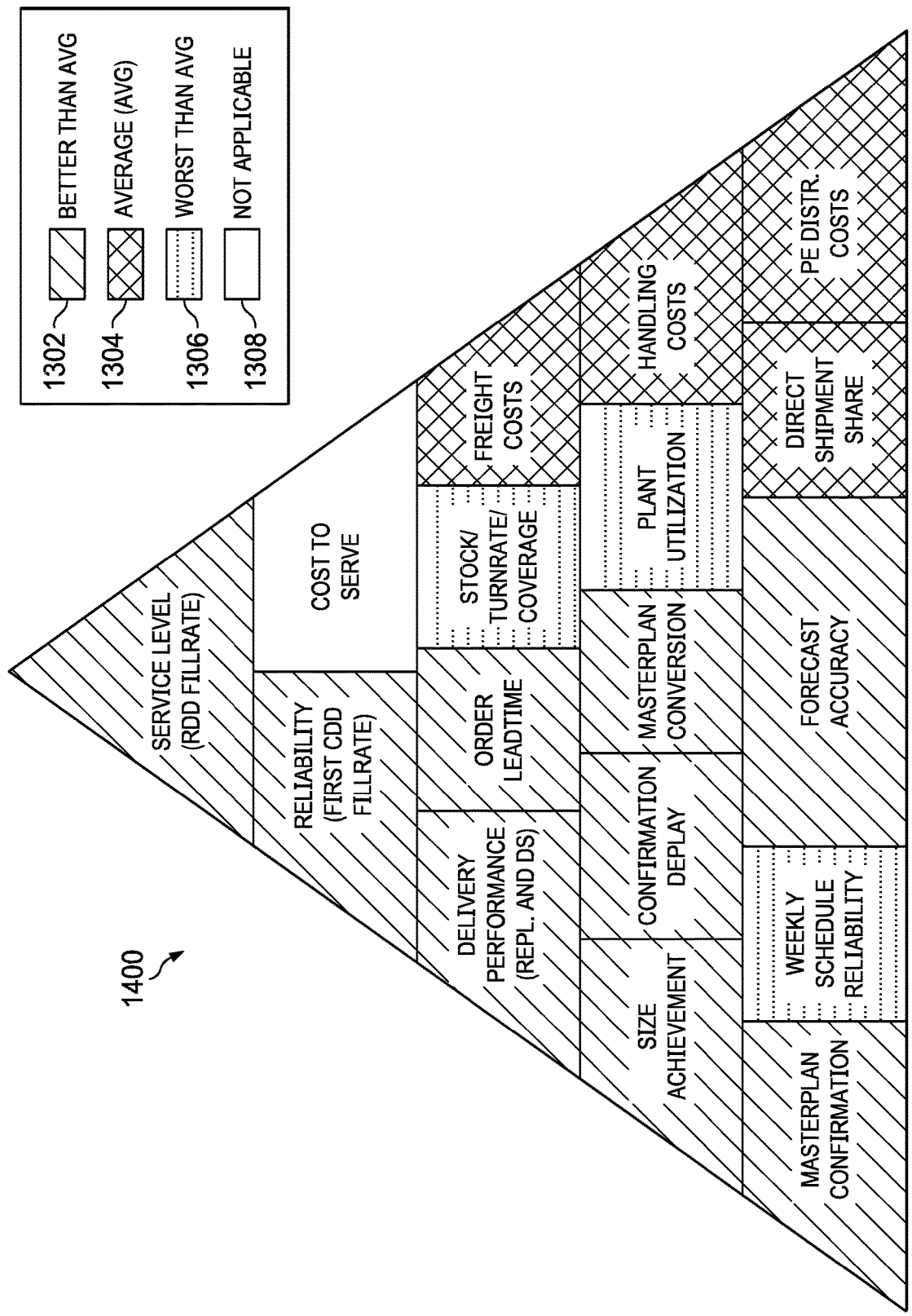
Figure 15:
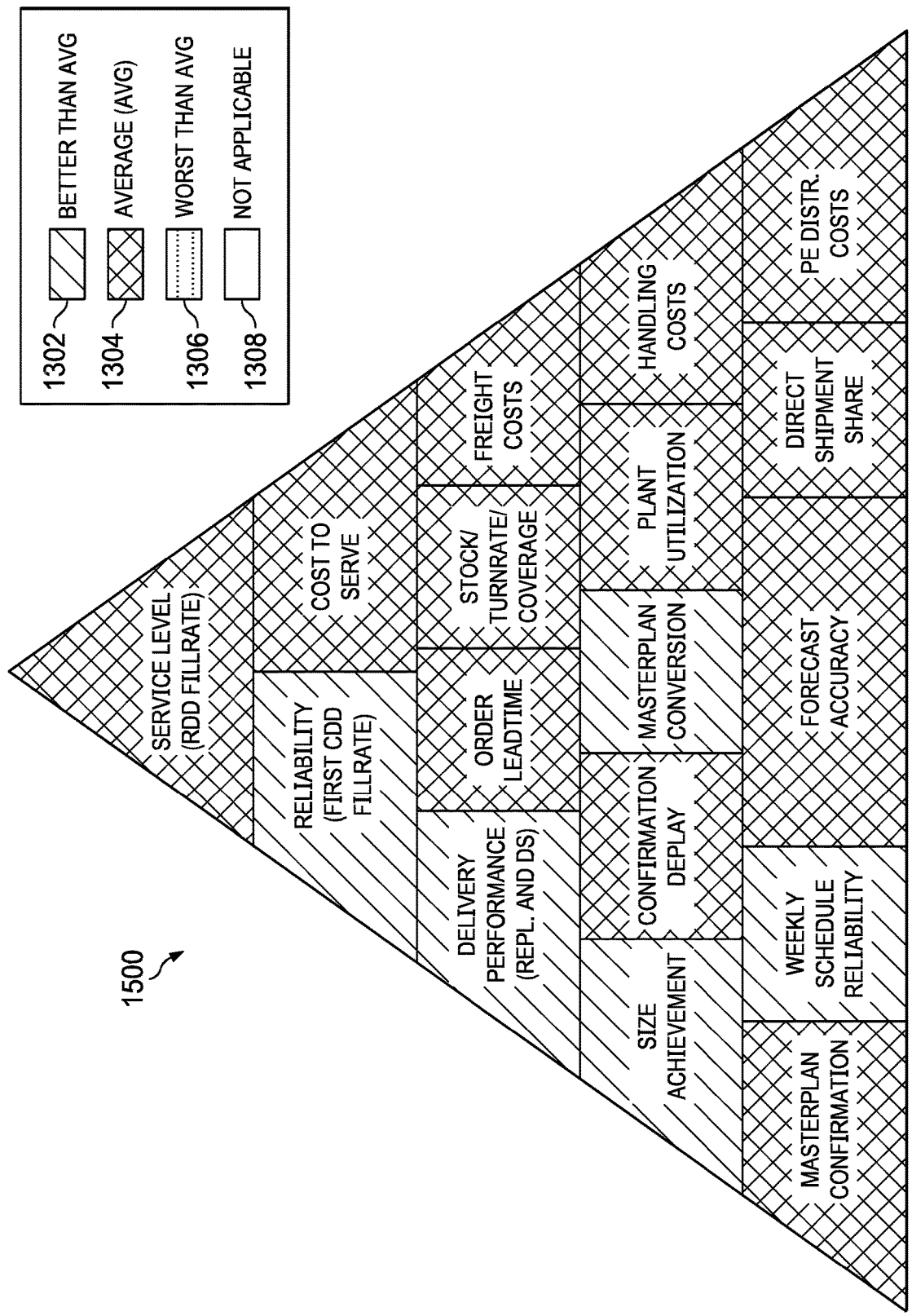
Figure 16:
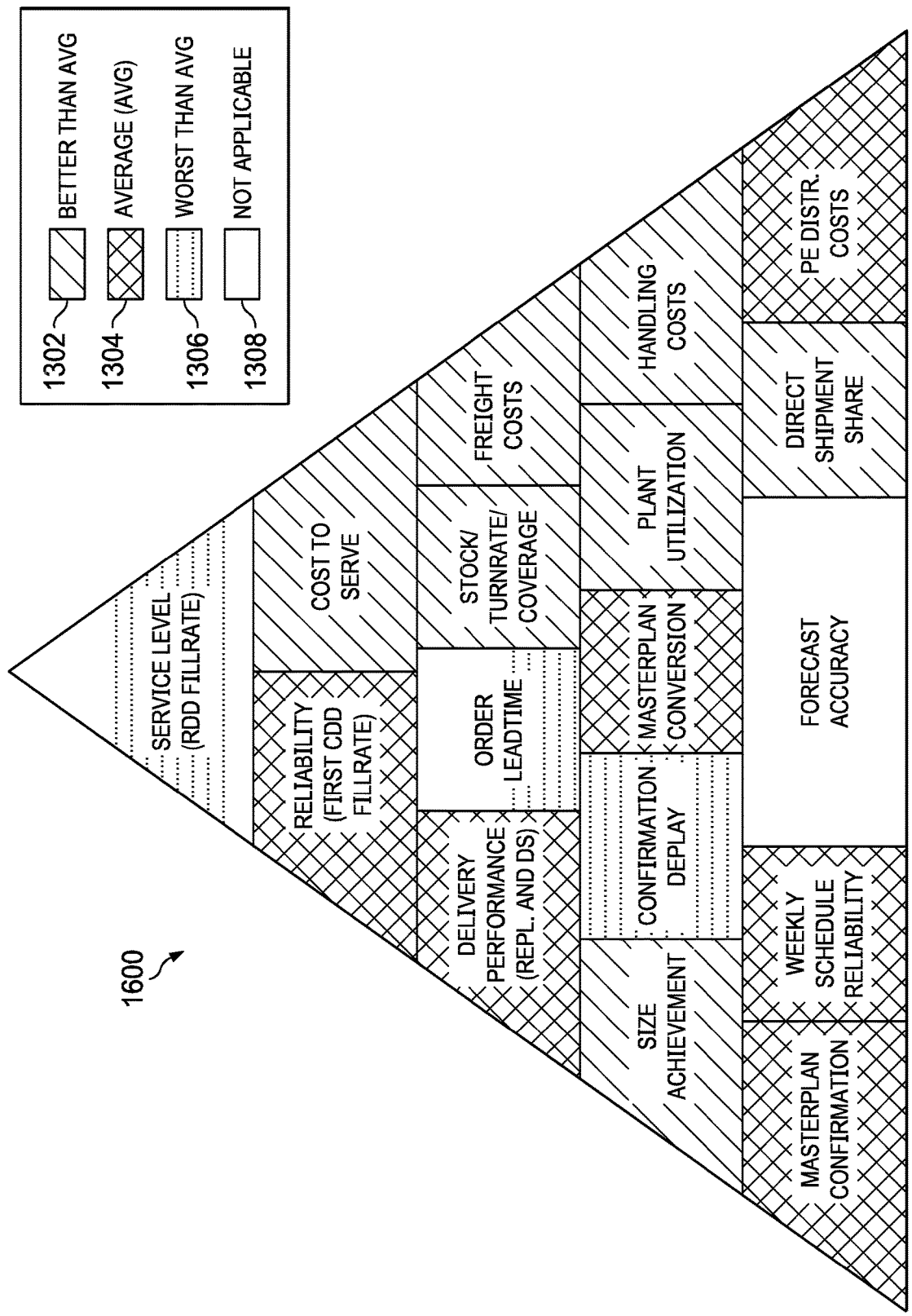
Figure 17:
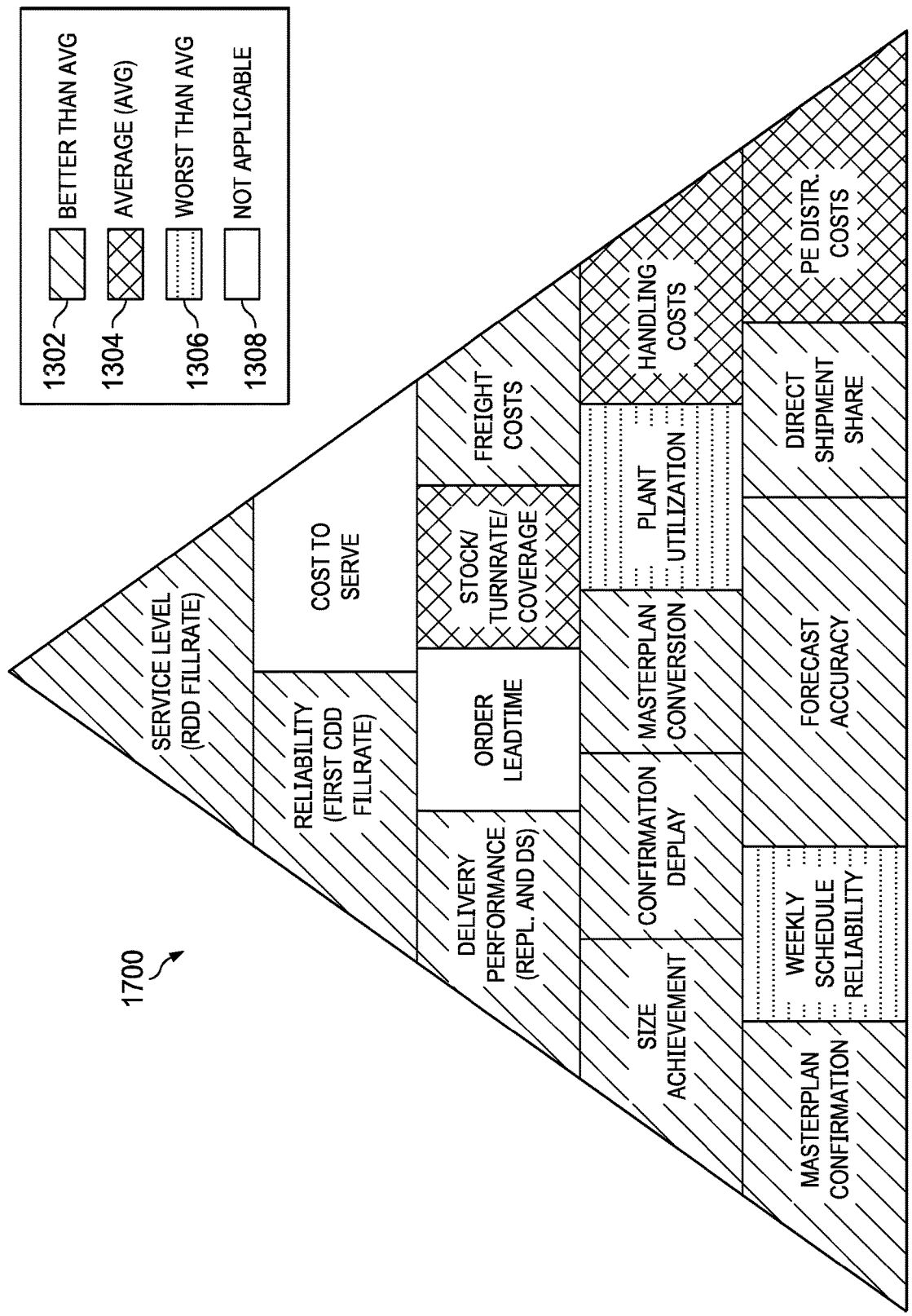

FIG. 13 illustrates a collaborative goal tree 1300 for various KPIs 1201a-1201q for an exemplary collaborative supply chain model, according to an embodiment. FIG. 14 illustrates an agile goal tree 1400 for various KPIs 1201a-1201q for an exemplary agile supply chain model, according to an embodiment. FIG. 15 illustrates a responsive goal tree 1500 for various KPIs 1201a-1201q for an exemplary responsive supply chain model, according to an embodiment. FIG. 16 illustrates an efficient goal tree 1600 for various KPIs 1201a-1201q for an exemplary efficient supply chain model, according to an embodiment. FIG. 17 illustrates a strategic goal tree 1700 for various KPIs 1201a-1201q for an exemplary strategic supply chain model, according to an embodiment. For strategic goal tree 1700, the order lead time KPI 1201e may not be applicable because the order lead time may depend on the model from which it is inherited.

From these goal trees 1300-1700, the principal KPIs 1201a-1201c and 1201e, which will lead to a differentiated service for each of the supply chain models, may be derived to clarify how different supply chain models will provide a differentiated service. For example, customers associated with an agile supply chain model, such as dealers, wholesalers, or e-commerce, may lack capacity to store inventory. For these customers, a plant utilization KPI 1201k may not be important because the company may produce more batches and not try to optimize full production capacity. Therefore, the plant utilization KPI 1201k may be color-coded to indicate worse than average 1306 in agile goal tree 1400.

When the color-coding of the KPIs 1201a-1201q are different for each goal tree 1200, this indicates that each supply chain model associated with the goal trees 1200 requires a different supply chain, or different supply chain approach. This method gives a clear and articulate explanation for why a company needs a particular number of supply chain models. By developing the color-coded goal tree 1300-1700, segmentation analyzer 110 may determine if all customer needs may be met by more or fewer supply chain models than the identified customer business models.

At action 1006, value offering module 200 identifies principal KPIs 1201a-1201c and 1201e that drive customer preferences. The disclosed method comprises a selection of principal KPIs 1201a-1201c and 1201e with the main impact in three areas: Service, Cost and Lead-time, based on the color-coding effort explained above. To differentiate supply chain performance, the minimal set of KPI 1201a-1201q in goal tree 1200 may be chosen (i.e. where the coloring is most obviously different for each supply chain model.)

After goal trees 1300-1700 are generated and color-coded for each supply chain model, value offering module 200 selects one or more principal KPIs 1201a-1201c and 1201e important to the customers. In the illustrated example, principal KPIs 1201a-1201c and 1201e that were determined to be most important are indicated by circles. These KPIs are Service Level (RDD fill-rate) 1201a, Reliability ($1^{st}$ CDO fill-rate) 1201b, Cost to Serve 1201c, and Order Lead-time 1201e. These KPIs 1201a-1201c and 1201e are then used to define performance radars for each supply chain model.

3. Defining Supply Chain Models to Support Customer Business Models

Figure 18:
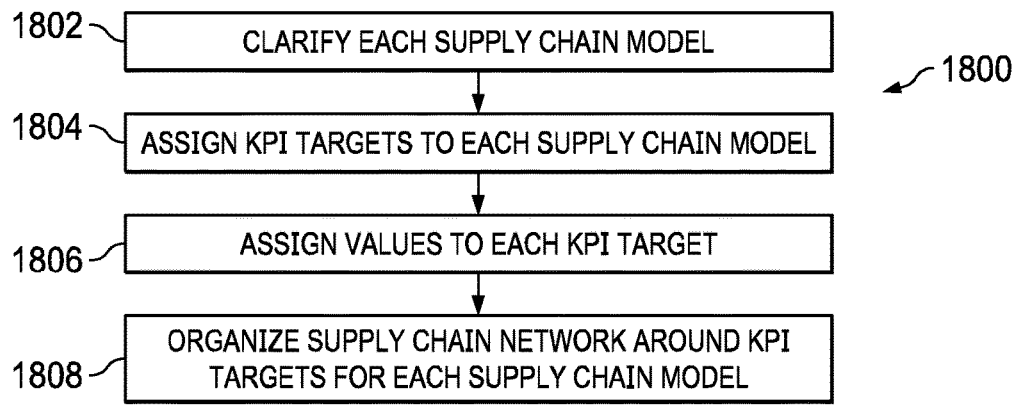
FIG. 18 illustrates defining supply chain models to support customer business models method, according to an embodiment.

At action 306 of FIG. 3 value offering module 200 may define supply chain models to support customer business models according to a defining supply chain models to support customer business models method. FIG. 18 illustrates defining supply chain models to support customer business models method 1800, according to an embodiment. Based on the foregoing principal KPIs, value offering module 200 defines supply chain models and organizes the supply chain network around KPI targets for each supply chain model. According to embodiments, defining supply chain models comprises assigning minimum, maximum, or ranges of values to each KPI target for each supply chain model.

At action 1802, each supply chain model to be defined is identified and assigned a name. The names may be, for example, linked to the customer business models (i.e. the company identified customers that are agile, responsive, collaborative, and the like). At action 1804, principal KPIs that were identified at action 1006 are assigned to a vertex of a performance radar. Although the performance radar is illustrated as a square, the performance radar may comprise any suitable shape with any number of vertexes, depending on the number of principal KPIs that drive customer preferences. At action 1806, values are assigned to each KPI on the performance radar for each of the supply chain models. These assigned values establish minimums, maximums, or ranges of values for each KPI for each supply chain model, which drive the services that are provided to customers within that supply chain.

At action 1808, the supply chain network is organized around the KPI targets for each supply chain model. According to embodiments, the supply chain network is altered from a single static supply chain to more than one active supply chains that require, for example, changing the number of products offered or the transportation of the products. Additionally, modules of supply chain planning are altered, end-to-end, beginning with, for example, demand planning and ending with, for example, order promising. The planning processes and execution processes are altered and configured for each supply chain model to meet the values of each KPI target and characteristics associated with each supply chain model. In other words, the method comprises end-to-end supply chain segmentation, not simply segmenting for inventory planning, segmenting for factory planning, or segmenting for demand planning.

Figure 19:
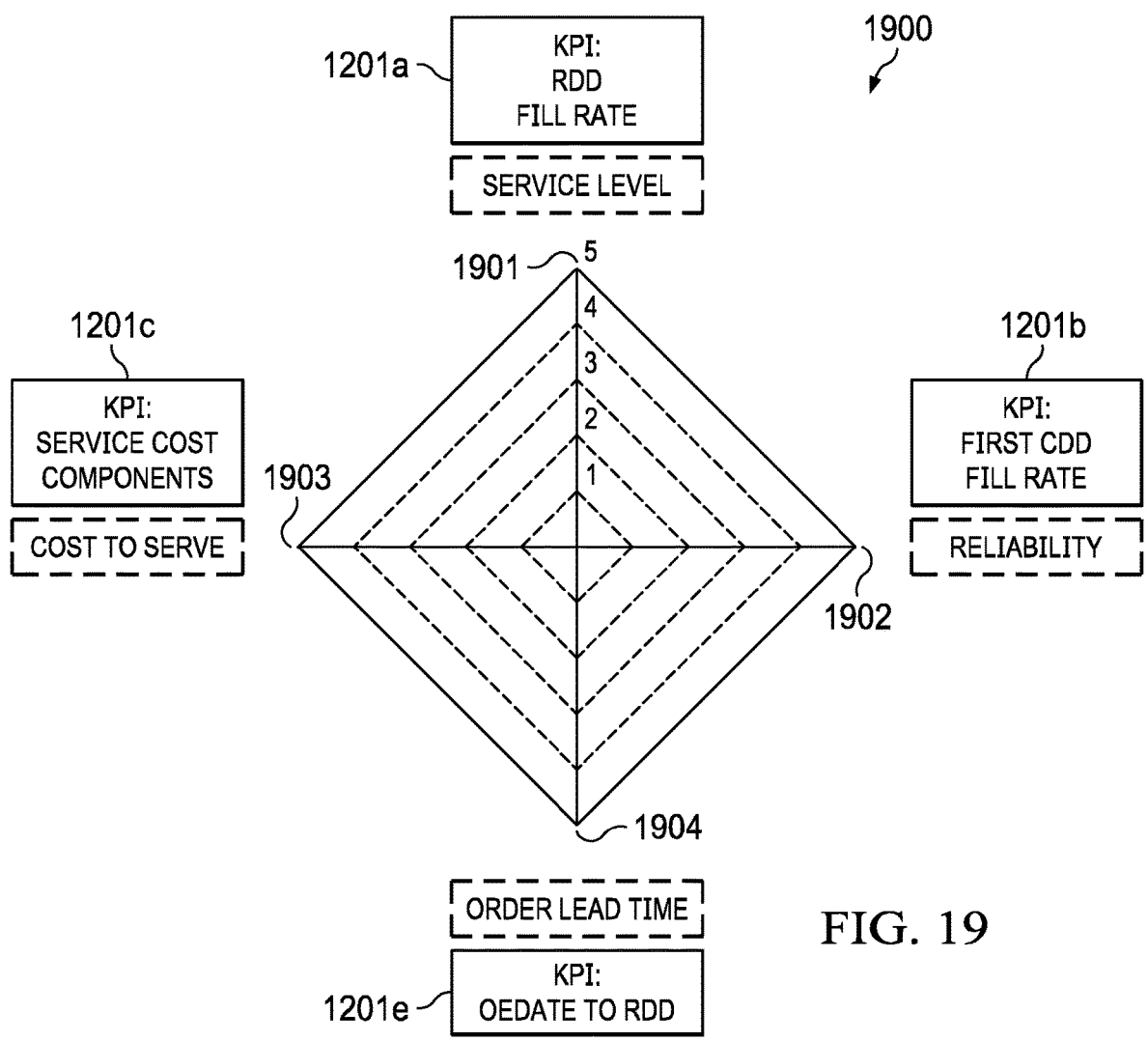
FIG. 19 illustrates a performance radar for exemplary supply chain models, according to an embodiment.

To further explain method 1800 of defining supply chain models, an example is now given. FIG. 19 illustrates a performance radar 1900 for exemplary supply chain models, according to an embodiment. In the following example, performance radar 1900 comprises a radar graph with each vertex 1901-1904 associated with a KPI chosen from value tree 1100. Continuing with the previous example of a tire manufacturer, the KPIs chosen from value tree 1100 that drive customer preferences are "Service Level," "Reliability," "Order Lead Time," and "Cost to Serve." Each of the KPI targets 1201a-1201c and 1201e is related to a measurement of the service associated with the KPI target. For example, Service Level may be measured by a Requested Delivery Date (RDD) fill rate. Reliability may be measured by a 1$^{st}$ Confirmed Delivery Date (CDD) fill rate. Order Lead Time may be measured by time between Order Entry and Requested Delivery Date (RDD). Cost to Serve may be measured by service cost components.

To represent each supply chain model on performance radar 1900, polygons are graphed inside performance radar 1900 whose vertexes fall within a range of values for each KPI 1201a-1201c and 1201e for each supply chain model. Each shape (here represented by diamonds), moving outward from the center of performance radar 1900 set a boundary for each subsequent value (i.e. the first diamond is a value of 1, the second diamond is a value of 2, and so on, to the outside perimeter of the performance radar, which equals a value of 5). Although performance radar 1900 is illustrated with values ranging from 1 to 5, embodiments contemplate value ranges of any suitable values.

Figure 20:
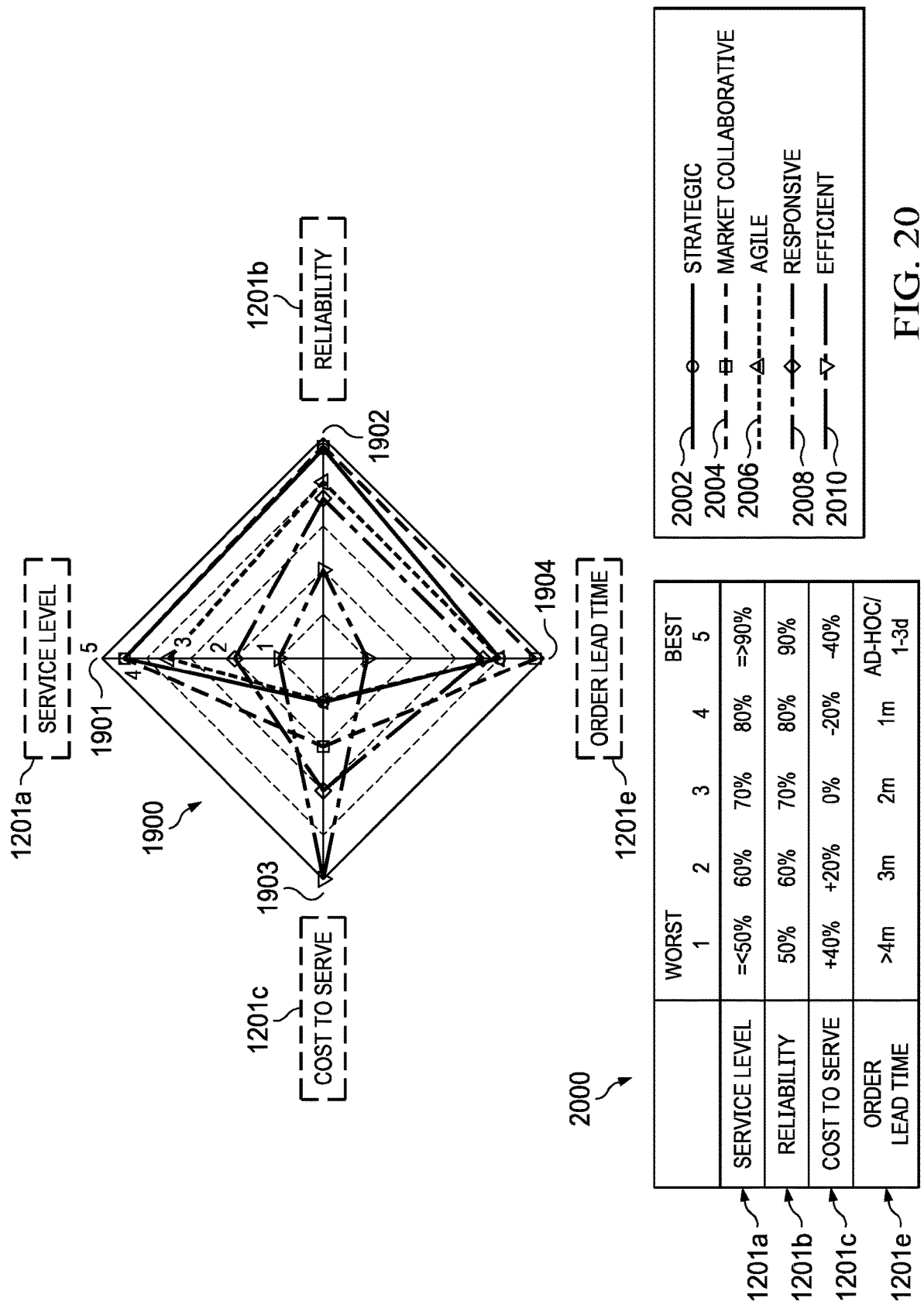
FIG. 20 illustrates exemplary supply chain models assigned to performance radar, according to an embodiment.

FIG. 20 illustrates exemplary supply chain models assigned to performance radar 1900, according to an embodiment. Supply chain models are graphed inside performance radar 1900 to indicate the KPI target level for each KPI 1201a-1201c and 1201e. The exemplary supply chain models graphed on performance radar 1900 comprise a strategic supply chain model 2002, a market collaborative supply chain model 2004, an agile supply chain model 2006, a responsive supply chain model 2008, and an efficient supply chain model 2010.

Each of the values on the performance radar corresponds to a minimum, maximum, or range of values for each KPI 1201a-1201c and 1201e as indicated in the key 2000. For example, the KPI "service level" 1201a has a range of 1-5. The efficient supply chain model 2010 is represented by a value of 1 on performance radar 1900 for the service level KPI 1201a. This corresponds to a service level of less than or equal to 50%, as indicated on key 2000. In contrast, the strategic supply chain model 2002 and collaborative supply chain model 2004 are represented by a 4 on performance radar 1900 for service level KPI 1201a. This corresponds to a service level of 80% (which may represent a minimum service level) for these supply chains.

As illustrated in the exemplary performance radar 1900, each supply chain model 2002-2010 comprises tradeoffs between the various KPIs 1201a-1201c and 1201e to target the specific needs of customers associated with each supply chain model 2002-2010. For example, the order lead time for efficient supply chain 2010 may take greater than four months, but the order lead time for a collaborative supply chain 2004 must be ad-hoc, which means within one to three days.

Each supply chain model 2002-2010 graphed on performance radar 1900 illustrates a tradeoff that each of these customer groupings expects to receive from the supply chain. Some customers will be more cost conscious, other customers will be more service conscious, and still other customers will be more sensitive to short lead times. Accordingly, each graphed supply chain model 2002-2010 may set a number of values that each of these customer business models expects and provides a map of the tradeoffs that indicates a particular customer service package. For example, the tradeoffs may comprise cost versus reliability or improved service versus short lead times. Higher services likely indicate a higher cost associated with it. Therefore, the graphed supply chain models 2002-2010 on performance radar 1900 quantify the relationship between service and cost, so that each customer may receive service appropriate for their needs.

As explained above, although exemplary performance radar 1900 is constructed based on four KPIs 1201a-1201c and 1201e, embodiments contemplate any number of KPIs, according to particular needs. For example, 2, 3, 4, 5, 6, 7, 8, 9, or any number of KPIs that are important to a customer. Although particular supply chain models 2002-2010 are shown and described, embodiments contemplate any suitable supply chain models according to particular needs. Additionally, each industry has different types of customers, and the customers in those industries may value different services. These customers may have different KPIs and different KPI requirements.

Taken together, the performance radar 1900 of each supply chain model 2002-2010, the selected KPIs 1201a-1201c and 1201e, and the customer business models uniquely identify the number of supply chain models that are required for a company to satisfy the customer expectations of various customer groups. Importantly, value offering method 300 provides limits to the amount of services that may be provided to certain customers (such as customers with a service level of 3, from performance radar 1900) compared with customers with a higher service level (such as customers with a service level of 5), which allows a company to keep both customers happy, while controlling the appropriate level of service and associated costs for the type of customers that is being serviced. This ensures the supply chain offers the right level of service to each customer group, whilst protecting its own margins and profitability.

Figure 21:
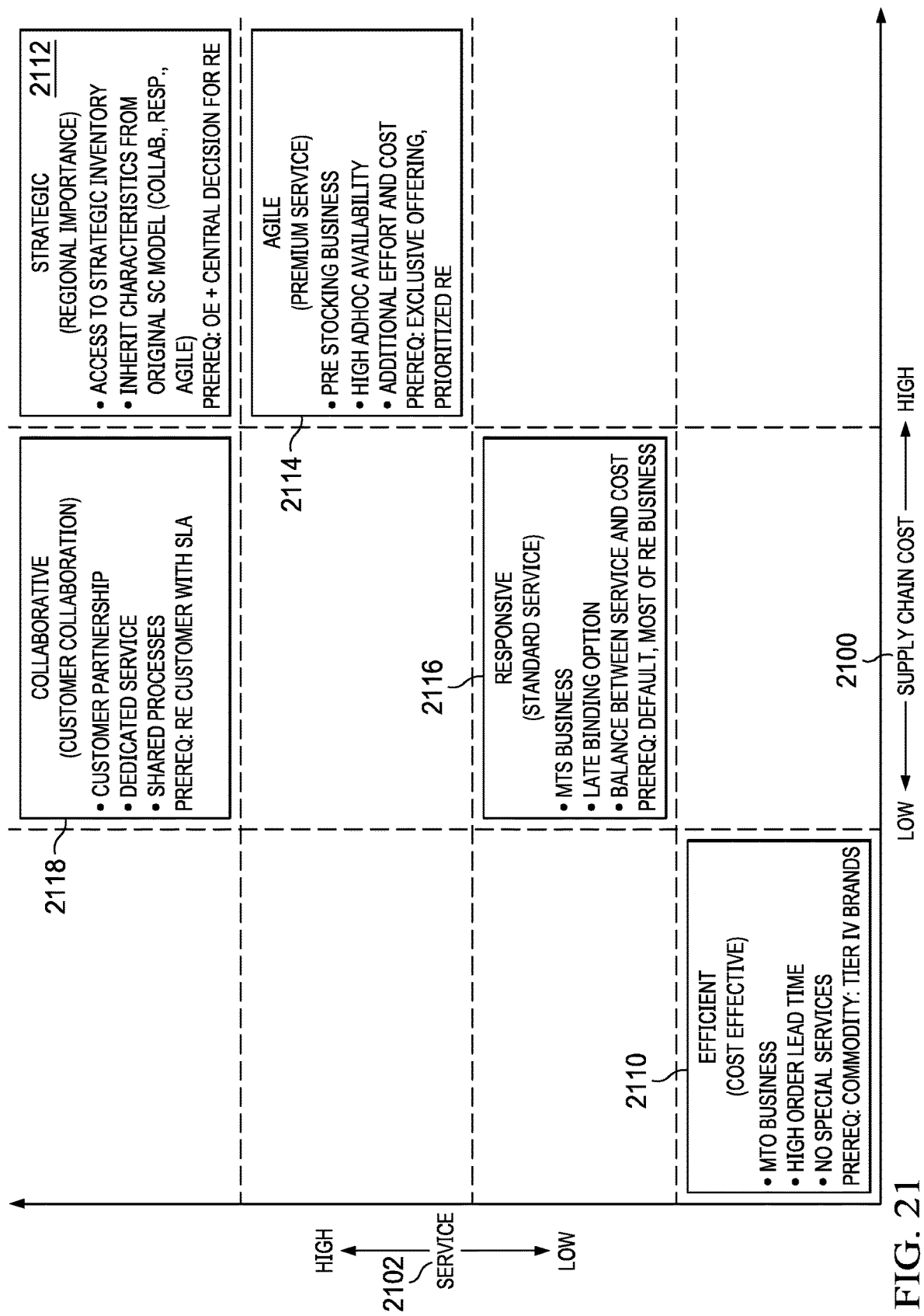
FIG. 21 illustrates tradeoffs between supply chain cost and service level 2102 for various exemplary supply chain models, according to embodiments.

FIG. 21 illustrates tradeoffs between supply chain cost 2100 and service level 2102 for various exemplary supply chain models 2110-2118, according to embodiments. On one hand, the efficient supply chain model 2110 offers the lowest cost, but also the least services. On the other hand, with cost increases, the type and quality of services can increase as well, which may be accomplished by making more levers available in the software in the supply chain to guarantee the higher services level. For example, customers of strategic supply chain 2112, who represent the customers having the highest level of services, may have the maximum number of levers available to them. Accordingly, customers of strategic supply chain 2112 need to spend a large amount of money to keep the one or more supply chain entities that service the strategic supply chain customers providing service at the expected level. As the level of service decreases, such as, for example, going from an agile supply chain 2114 to a responsive supply chain 2116, or a responsive supply chain 2116 to an efficient supply chain 2110, fewer of these levers would be available in the software, but, in exchange, these customers would benefit from a lower cost. Similarly, some customers may require a high level of service while still requiring a lower cost, such as a collaborative supply chain 2118, when compared with strategic supply chain 2112.

Additionally, supply chain segmentation according to the value offering method 300 transforms standardized supply chain processes from a single linear supply chain into multiple virtual and parallel supply chains, operating the same physical supply chain. A company with a segmented supply chain can tailor service expectations to each customer and receive a competitive advantage in terms of logistic service offering, without increasing the complexity of its operations due to unnecessary customizations in its processes.

Figure 22A:
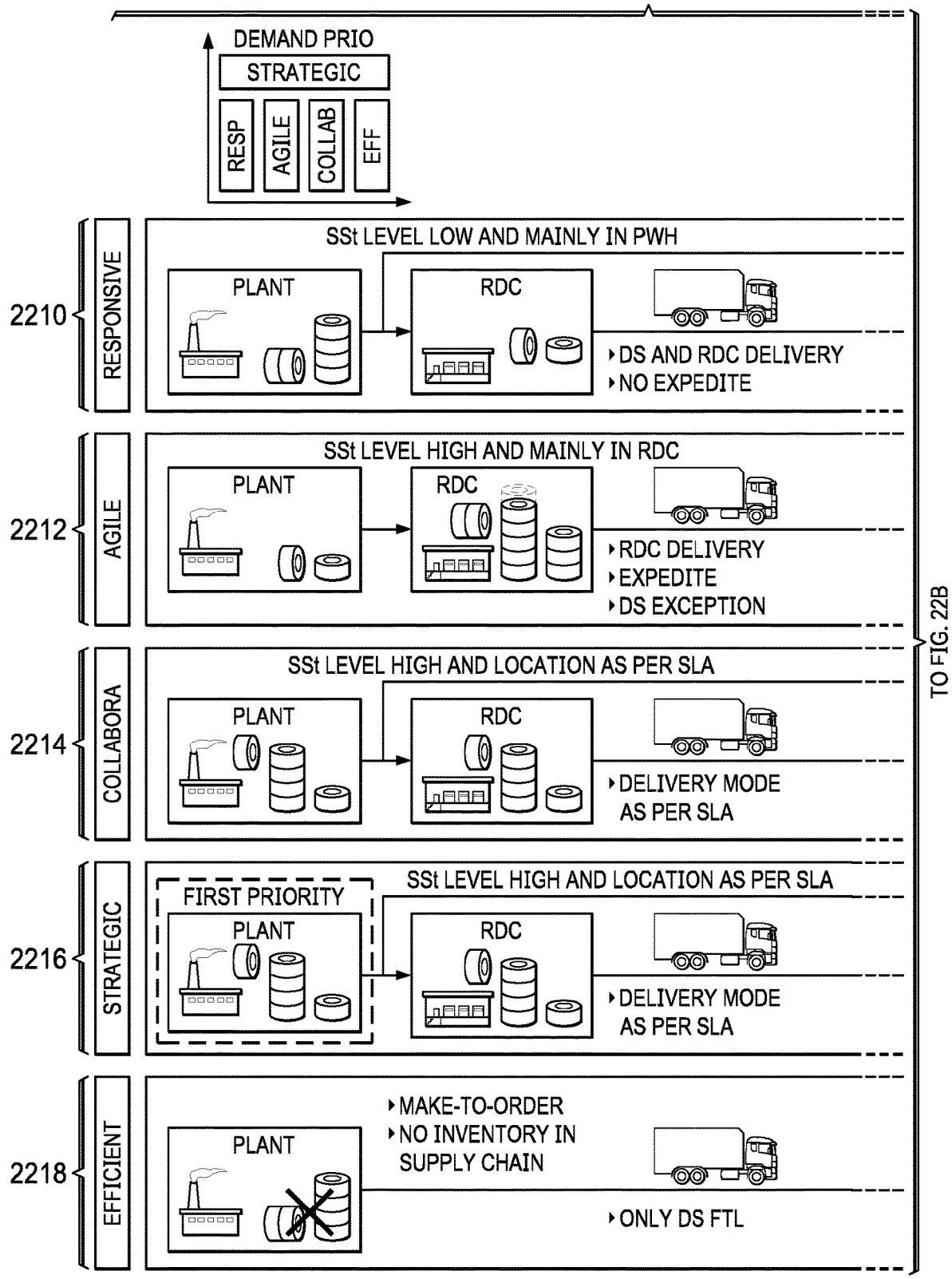
FIGS. 22A-C illustrate a summary supply chain view and a market view of exemplary supply chain models, according to an embodiment.
Figure 22B:
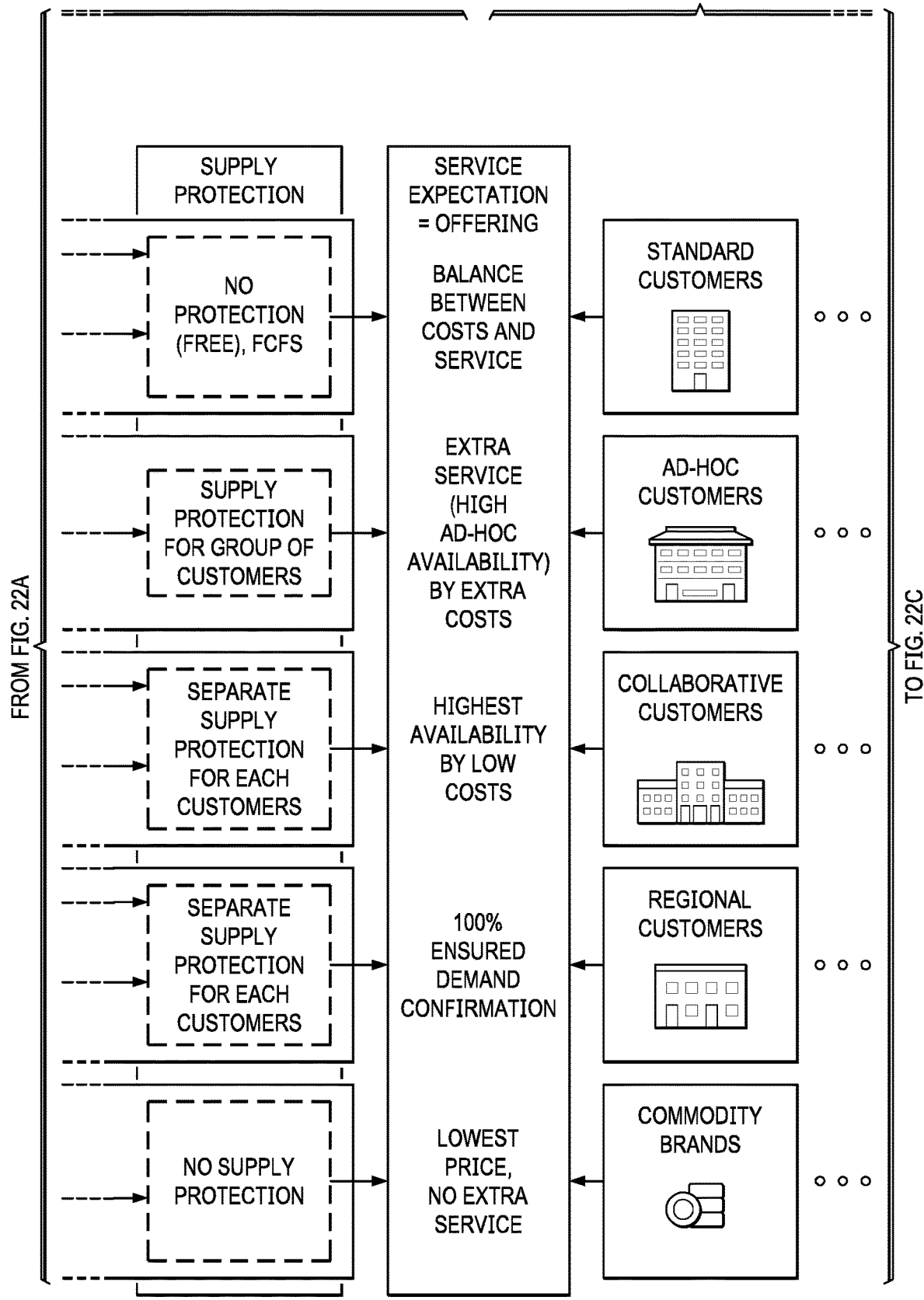
Figure 22C:
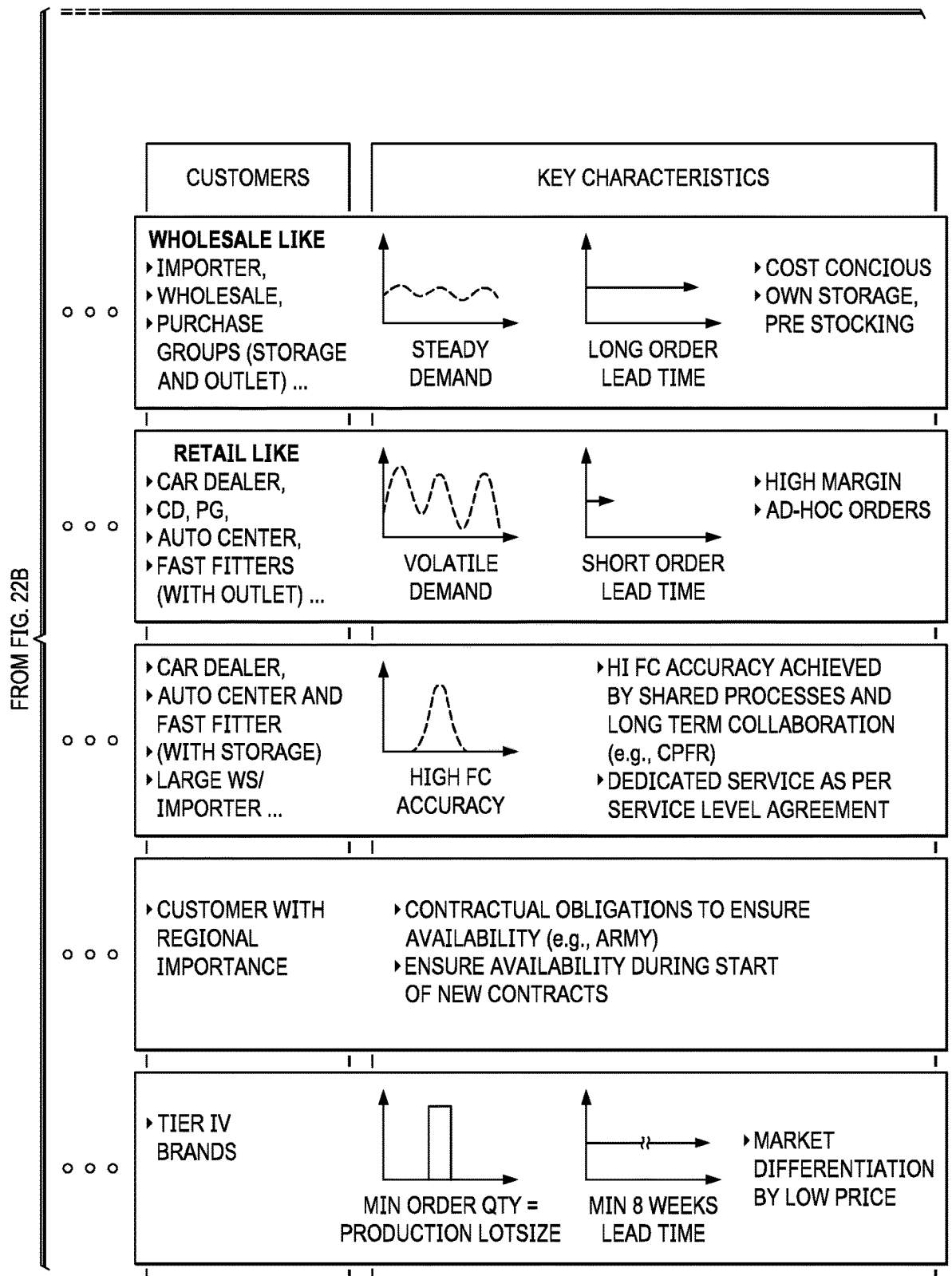

FIGS. 22A-C illustrate a summary supply chain view 2200 and a market view 2202 of exemplary supply chain models 2210-2218, according to an embodiment. Supply chain segmentation clarifies the service expectations with market view 2202 and then translates the defined service requirements into supply chain capabilities (supply chain view 2200). Market view 2202 defines the customer clusters which require differences in service. Supply chain view 2200 defines the levers and options in the supply chain to differentiate the service for each of the agreed customer clusters. The goal is to redesign and segment the supply chain from a single process with one software setup for planning and execution, to a process supported by different configurations across all supply chain planning system modules, in alignment with the agreed market view 2202.

Typically, supply chain models evolve over time as customer service requirements for a particular group of customers change. In addition, the supply chain model assigned to the customer may change as well because some customers ask for service upgrades or more cost reductions. Traditionally a company has one process for each supply chain and one system consisting of a lot of modules (demand planning, master planning, delivery, and the like), but the system typically comprises a single process with many customizations on that process to meet the different needs of different customers. For example, customers (wholesale, retailer, and the like) each receive the same demand planning, master planning, delivery, and other systems, which are then highly customized for each customer.

However, each customer has different expectations. According to the disclosed supply chain segmentation, each customer is assigned a customer business model, which may then receive a different supply chain model. For example, a wholesale customer has the customer expectation of low price. This expectation is then met by creating a cost-optimized supply chain model to configure the supply chain to meet the wholesale customer's expectations. Similarly, the retailer customer has the customer expectation of ad-hoc availability. This expectation is then met by creating an availability-optimized supply chain. Although particular examples of customer, customer expectations, and supply chain models are given, embodiments contemplate any type or number of customer, customer expectations, and supply chain models, as will be discussed in more detailed below.

Based on the supply chain models, the supply chain may be altered from a single static supply chain to more than one active supply chains that require, for example, changing the number of products offered or the transportation of the products. Additionally, the disclosed method alters all modules of supply chain planning, end-to-end, beginning with, for example, demand planning and ending with, for example, order promising. The disclosed method may alter all the planning processes and execution processes and configure them differently for each supply chain model. In other words, the method comprises end-to-end supply chain segmentation, not simply segmenting for inventory planning or segmenting for factory planning or segmenting for demand planning.

In the marketing discipline, segmentation is applied to product assortment. For example, a car manufacturer may change from offering a single SUV for all customer groups to designing two SUV's-one for customers with big dogs and one for customers with families. Applied to supply chain management, as illustrated in a further example, the supply chain may determine that low price is more important to some customers so that some customers receive products whose components are sourced from low cost sources, whereas for other customers ad-hoc availability is more important, so that components for the products for these customers are kept in an upstream stock plant or warehouse, sourced from more reliable sources with more inventory, or sourced from the first available regional distribution center (RDC) source near the customer. In this respect, each of the supply chain models represents different tradeoffs between the other supply chain models to best match a customer's needs.

Additionally, according to embodiments, segmentation analyzer 110 comprises a user interface that provides mapping products and customers to different supply chain models. For example, the user interface may allow one or more companies to assign customers, products, and/or customer-product clusters directly to a particular supply chain model (such as, for example, an agile or responsive supply chain model). The user interface may comprise one or more user dashboards that provide for inputting a supply chain model or business strategy, such as, for example, a high-cost, high-bid, low-margin business strategy. According to embodiments, the user interface provides for implementing the business strategy by assigning supply chain models to customers, products, or customer-product clusters. The user interface may comprise default strategies that are assigned to a particular industry, and which automatically populate operational policies which improve segmentation and/or efficiency of the supply chain.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for identifying supply chain segmentations from an initially non-segmented supply chain by a computer comprising a processor and a memory, comprising:
   receiving a current state of items in a supply chain network comprising one or more supply chain entities, wherein an inventory of the one or more supply chain entities is used to store one or more items, and a state of the items comprises a quantity and ordered flow among the inventory of the one or more supply chain entities, wherein the current state of the items is based, at least in part, on scanning an identifier corresponding to each of the items, and further wherein the identifier comprises a radio-frequency identification tag;
   organizing the one or more supply chain entities into one or more customer clusters based, at least in part, on the size of the inventory and service expectations of the one or more supply chain entities;
   associating customer business models for each of the customer clusters that meet requirements of the size of the inventory and service expectations of the one or more supply chain entities, wherein the customer business models are tiered according to service levels, the service levels specifying supply chain service requirements;
   setting relative values to one or more key process indicators of the one or more supply chain entities to one or more goal trees where each goal tree comprises at least one relative value of the one or more key process indicators that is different from each other goal tree of the one or more goal trees, wherein the one or more goal trees each comprise a graphical hierarchy of one or more key process indicators arranged within a pyramid or triangle of at least three levels, the graphical hierarchy color coded to indicate performance of the one or more key process indicators, and further wherein a higher level key process indicator in the hierarchy is related at least in part to one or more lower level key process indicators in the hierarchy;
   identifying one or more supply chain models based, at least in part, on the one or more goal trees that meet targets of one or more principal key process indicators of the one or more key process indicators, wherein the number of the one or more goal trees is equal to the number of the one or more supply chain models; and
   in response to the one or more customer business models and the one or more principal key process indicators, instructing robotic machinery to transport items among the one or more supply chain entities to restock the inventory of the one or more items according to the current state of items in the supply chain network.

2. The computer-implemented method of claim 1, further comprising:
   determining an inventory policy based, at least in part, on the targets of the one or more principal key process indicators that is indicative of the projected service level for an item in the inventory for one or more successive inventory planning periods.

3. The computer-implemented method of claim 2, wherein the one or more principal key process indicators is one or more of service level, reliability, cost to serve, and order lead time.

4. The computer-implemented method of claim 3, wherein the targets of the one or more principal key process indicators comprises one or more of a minimum, a maximum, and a range of values.

5. The computer-implemented method of claim 4, further comprising:
   defining one or more customer-product clusters; and
   assigning the one or more supply chain models to the one or more customer-product clusters.

6. The computer-implemented method of claim 5, further comprising:
   configuring supply chain processes with levers, enablers, and configuration options to enforce the one or more supply chain models to one or more of customers, products, and the customer-product clusters.

7. A system of identifying supply chain segmentations from an initially non-segmented supply chain, comprising:
   a computer comprising a processor and a memory and configured to:
   receive a current state of items in a supply chain network comprising one or more supply chain entities, wherein an inventory of the one or more supply chain entities is used to store one or more items, and a state of the items comprises a quantity and ordered flow among the inventory of the one or more supply chain entities, wherein the current state of the items is based, at least in part, on scanning an identifier corresponding to each of the items, and further wherein the identifier comprises a radio-frequency identification tag;
   organize the one or more supply chain entities into one or more customer clusters based, at least in part, on the size of the inventory and service expectations of the one or more supply chain entities;
   associate customer business models for each of the customer clusters that meet requirements of the size of the inventory and service expectations of the one or more supply chain entities, wherein the customer business models are tiered according to service levels, the service levels specifying supply chain service requirements;

set relative values to one or more key process indicators of the one or more supply chain entities to one or more goal trees where each goal tree comprises at least one relative value of the one or more key process indicators that is different from each other goal tree of the one or more goal trees, wherein the one or more goal trees each comprise a graphical hierarchy of one or more key process indicators arranged within a pyramid or triangle of at least three levels, the graphical hierarchy color coded to indicate performance of the one or more key process indicators, and further wherein a higher level key process indicator in the hierarchy is related at least in part to one or more lower level key process indicators in the hierarchy; and identify one or more supply chain models based, at least in part, on the one or more goal trees that meet targets of one or more principal key process indicators of the one or more key process indicators, wherein the number of the one or more goal trees is equal to the number of the one or more supply chain models; and robotic machinery that, in response to the one or more customer business models and the one or more principal key process indicators, transport items among the one or more supply chain entities to restock the inventory of the one or more items according to the current state of items in the supply chain network.

8. The system of claim 7, wherein the computer is further configured to:

determine an inventory policy based, at least in part, on the targets of the one or more principal key process indicators that is indicative of the projected service level for an item in the inventory for one or more successive inventory planning periods.

9. The system of claim 8, wherein the one or more principal key process indicators is one or more of service level, reliability, cost to serve, and order lead time.

10. The system of claim 9, wherein the targets of the one or more principal key process indicators comprises one or more of a minimum, a maximum, and a range of values.

11. The system of claim 10, wherein the computer is further configured to:

define one or more customer-product clusters; and assign the one or more supply chain models to the one or more customer-product clusters.

12. The system of claim 11, wherein the computer is further configured to:

configure supply chain processes with levers, enablers, and configuration options to enforce the one or more supply chain models to one or more of customers, products, and the customer-product clusters.

13. A non-transitory computer-readable medium embodied with software, the software when executed configured to identify supply chain segmentations from an initially non-segmented supply chain by:

receiving a current state of items in a supply chain network comprising one or more supply chain entities, wherein an inventory of the one or more supply chain entities is used to store one or more items, and a state of the items comprises a quantity and ordered flow among the inventory of the one or more supply chain entities, wherein the current state of the items is based, at least in part, on scanning an identifier corresponding to each of the items, and further wherein the identifier comprises a radio-frequency identification tag;

organizing the one or more supply chain entities into one or more customer clusters based, at least in part, on the size of the inventory and service expectations of the one or more supply chain entities;

associating customer business models for each of the customer clusters that meet requirements of the size of the inventory and service expectations of the one or more supply chain entities, wherein the customer business models are tiered according to service levels, the service levels specifying supply chain service requirements;

setting relative values to one or more key process indicators of the one or more supply chain entities to one or more goal trees where each goal tree comprises at least one relative value of the one or more key process indicators that is different from each other goal tree of the one or more goal trees, wherein the one or more goal trees each comprise a graphical hierarchy of one or more key process indicators arranged within a pyramid or triangle of at least three levels, the graphical hierarchy color coded to indicate performance of the one or more key process indicators, and further wherein a higher level key process indicator in the hierarchy is related at least in part to one or more lower level key process indicators in the hierarchy;

identifying one or more supply chain models based, at least in part, on the one or more goal trees that meet targets of one or more principal key process indicators of the one or more key process indicators, wherein the number of the one or more goal trees is equal to the number of the one or more supply chain models; and in response to the one or more customer business models and the one or more principal key process indicators, directing robotic machinery to transport items among the one or more supply chain entities to restock the inventory of the one or more items according to the current state of items in the supply chain network.

14. The non-transitory computer-readable medium of claim 13, wherein the software when executed is further configured to:

determine an inventory policy based, at least in part, on the targets of the one or more principal key process indicators that is indicative of the projected service level for an item in the inventory for one or more successive inventory planning periods.

15. The non-transitory computer-readable medium of claim 14, wherein the one or more principal key process indicators is one or more of service level, reliability, cost to serve, and order lead time.

16. The non-transitory computer-readable medium of claim 15, wherein the targets of the one or more principal key process indicators comprises one or more of a minimum, a maximum, and a range of values.

17. The non-transitory computer-readable medium of claim 16, wherein the software when executed is further configured to:

define one or more customer-product clusters; and assign the one or more supply chain models to the one or more customer-product clusters.

* * * * *